(12) United States Patent  (10) Patent No.: US 8,698,716 B2
Lu et al.  (45) Date of Patent: Apr. 15, 2014

(54) LOW POWER CONSUMPTION TRANSFLECTIVE LIQUID CRYSTAL DISPLAYS

(75) Inventors: Ruibo Lu, San Bruno, CA (US); Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 719 days.

(21) Appl. No.: 12/782,574

(22) Filed: May 18, 2010

(65) Prior Publication Data

US 2011/0285684 A1   Nov. 24, 2011

(51) Int. Cl.
*G09G 3/36* (2006.01)
*G02F 1/1335* (2006.01)

(52) U.S. Cl.
USPC .............. 345/87; 349/113; 349/114; 349/115

(58) Field of Classification Search
None
See application file for complete search history.

(56) References Cited

U.S. PATENT DOCUMENTS

| | | | |
|---|---|---|---|
| 6,057,901 A | 5/2000 | Xu | |
| 6,341,002 B1 | 1/2002 | Shimizu et al. | |
| 6,847,426 B2 | 1/2005 | Fujimori et al. | |
| 6,917,404 B2 | 7/2005 | Baek | |
| 2002/0054269 A1* | 5/2002 | Maeda et al. ............... | 349/181 |
| 2003/0076464 A1 | 4/2003 | Ozawa et al. | |
| 2004/0004687 A1 | 1/2004 | Heum | |
| 2005/0057704 A1 | 3/2005 | Ootake et al. | |
| 2005/0083459 A1 | 4/2005 | Ukawa et al. | |
| 2005/0083462 A1 | 4/2005 | Lin | |
| 2005/0140862 A1 | 6/2005 | Jang et al. | |
| 2006/0050209 A1 | 3/2006 | Higa | |
| 2006/0139530 A1 | 6/2006 | Ukawa et al. | |
| 2006/0274236 A1 | 12/2006 | Chai et al. | |
| 2007/0165169 A1 | 7/2007 | Jang et al. | |
| 2007/0252931 A1 | 11/2007 | Wu et al. | |
| 2008/0030661 A1 | 2/2008 | Tung et al. | |
| 2008/0030664 A1 | 2/2008 | Tung et al. | |
| 2008/0043185 A1 | 2/2008 | Jeng et al. | |
| 2008/0055526 A1 | 3/2008 | Ino | |
| 2008/0074592 A1 | 3/2008 | Araki et al. | |

(Continued)

FOREIGN PATENT DOCUMENTS

CN   101140399 A   3/2008
JP   2003322855 A   11/2003

(Continued)

OTHER PUBLICATIONS

International Searching Authority, "The International Search Report and Written Opinion" Applicant, Pixel Qi Corporation, PCT/US2010/035298, dated Feb. 23, 2011, 9 pages.

(Continued)

*Primary Examiner* — Waseem Moorad
(74) *Attorney, Agent, or Firm* — Hickman Palermo Truong Becker Bingham Wong LLP

(57) ABSTRACT

Techniques are provided to drive a normally white or mixed mode LCD with low voltages and low power consumption. A sub-pixel in the LCD may comprise a reflective part and a transmissive part. The cell gap for a liquid crystal layer in the sub-pixel may provide at least a half-wave phase retardation. A driving voltage range with a maximum voltage at a low value may be used to drive the reflective part and the transmissive part of the sub-pixel to various levels of brightness.

31 Claims, 16 Drawing Sheets

(56) References Cited

U.S. PATENT DOCUMENTS

| | | | |
|---|---|---|---|
| 2008/0100782 A1* | 5/2008 | Choi et al. ................... | 349/96 |
| 2008/0136982 A1 | 6/2008 | Watanabe et al. | |
| 2008/0151157 A1 | 6/2008 | Okumura | |
| 2009/0284693 A1 | 11/2009 | Adachi et al. | |
| 2010/0020054 A1 | 1/2010 | Jepsen | |
| 2010/0073332 A1 | 3/2010 | Gettemy et al. | |
| 2010/0110351 A1 | 5/2010 | Kim et al. | |
| 2010/0134734 A1 | 6/2010 | Kim et al. | |
| 2010/0225855 A1* | 9/2010 | Lu ................................ | 349/96 |
| 2012/0039034 A1 | 2/2012 | Jepsen et al. | |
| 2012/0120341 A1 | 5/2012 | Lu et al. | |

FOREIGN PATENT DOCUMENTS

| | | |
|---|---|---|
| JP | 2003322855 A | 11/2003 |
| JP | 2008077108 A | 4/2008 |
| KR | 20030068323 A | 8/2003 |
| TW | 567360 | 12/2003 |
| TW | 594127 B | 6/2004 |
| TW | 200710484 | 6/2006 |
| TW | 200636348 | 10/2006 |

OTHER PUBLICATIONS

Claims as filed with PCT/2010/035298, 7 pages.

Korean Patent Office, Office Action in application No. 10-2011-7023804, dated Nov. 29, 2012, 6 pages.

Current Claims in Korean Application No. 10-2011-7023804, dated Nov. 2012, 9 pages.

Japan Patent Office, "Notice of Grounds for Rejection" in application No. 2011-554029, dated May 21, 2013, 6 pages.

Current Claims in application No. 2011-554029, dated May 2013, 6 pages.

Primary Examination Report in application No. 099121075, dated May 13, 2013, 14 pages.

Current Claims in application No. 099121075, dated May 2013, 8 pages.

Korean Intellectual Property Office, "International Search report and written opinion", in application No. PCT/US2011/047520, dated Apr. 9, 2012, 9 pages.

Current Claims in application No. PCT/2011/047520, dated Apr. 2012, 4 pages.

The State Intellectual Property Office of the People's Republic of China, "Office Action" in application No. 200980159174.X, dated Dec. 4, 2013, 10 pages.

Current Claims in application No. 200980159174.X, dated Dec. 2013, 10 pages.

Tiplo Attorneys at Law, "Office Action" in application No. 100128861, dated Dec. 24, 2013, 6 pages.

Current Claims in application No. 100128861, Dec. 2013, 4 pages.

* cited by examiner

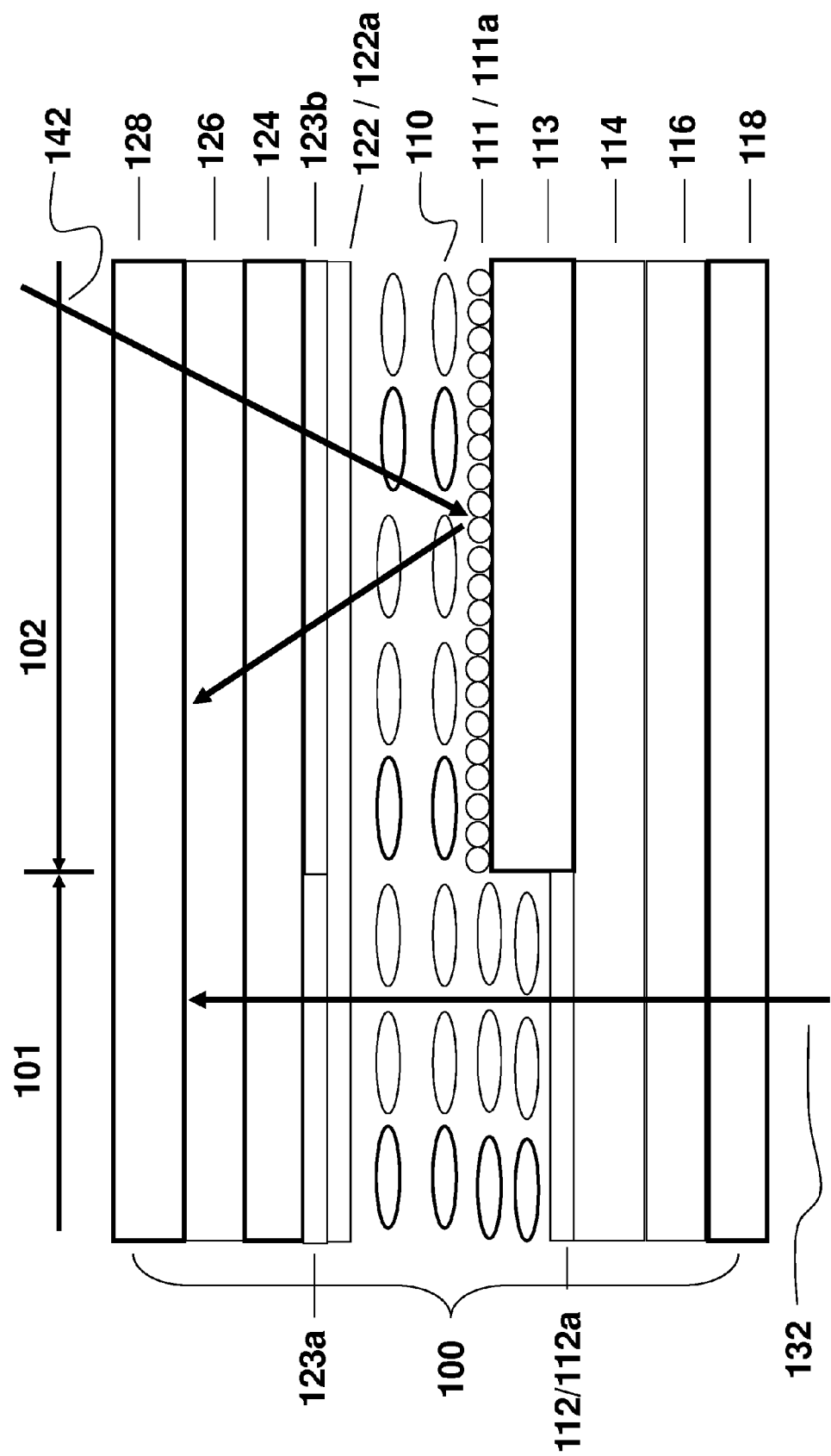

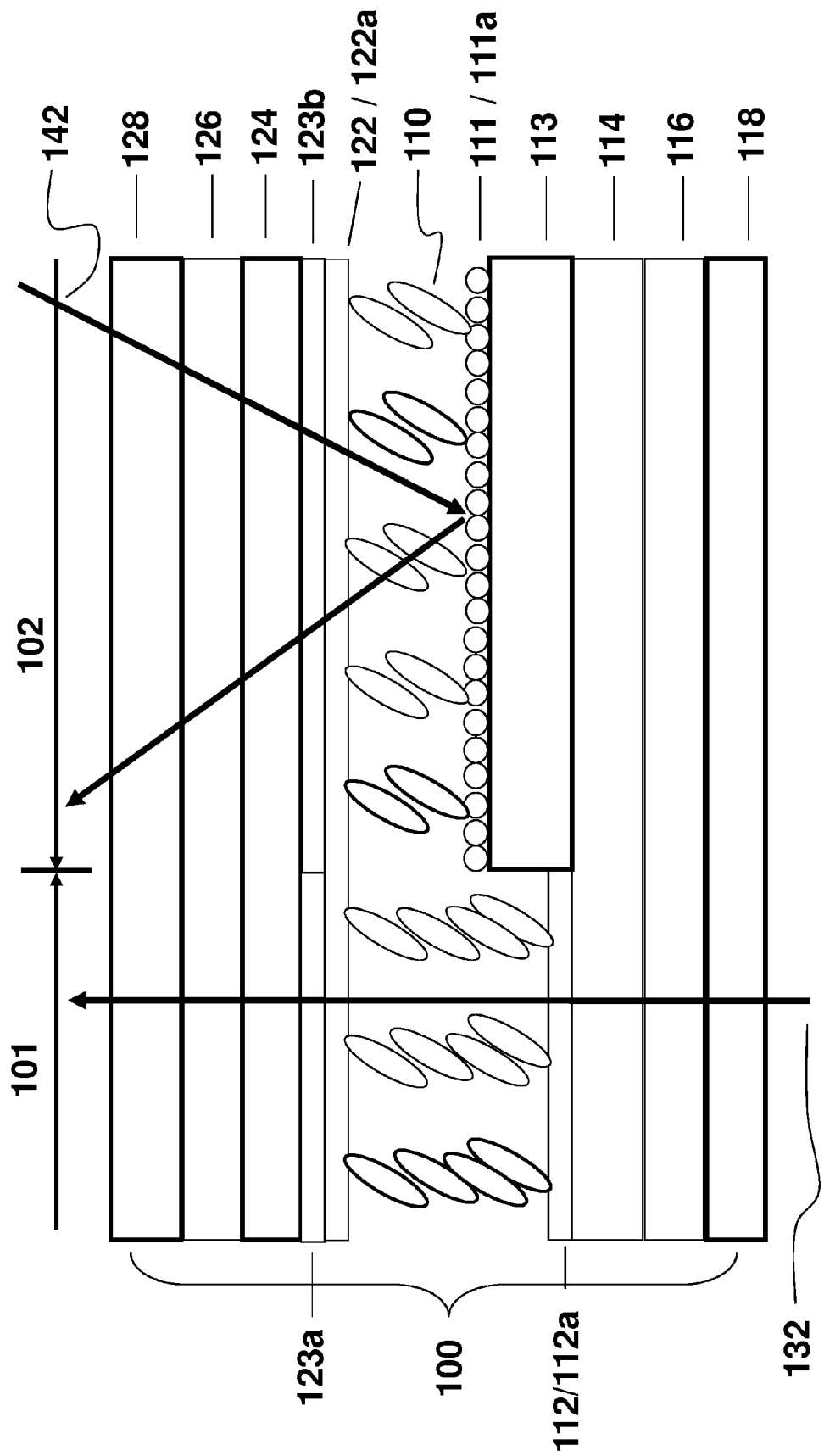

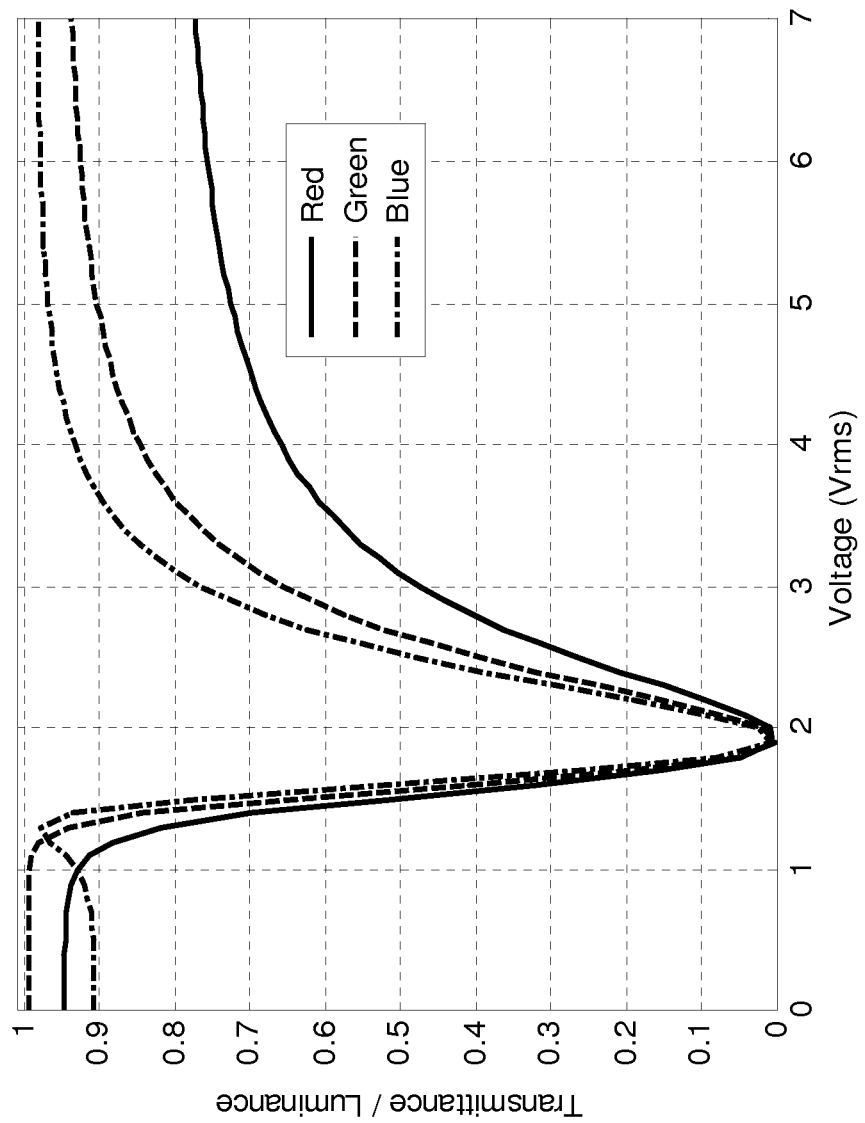

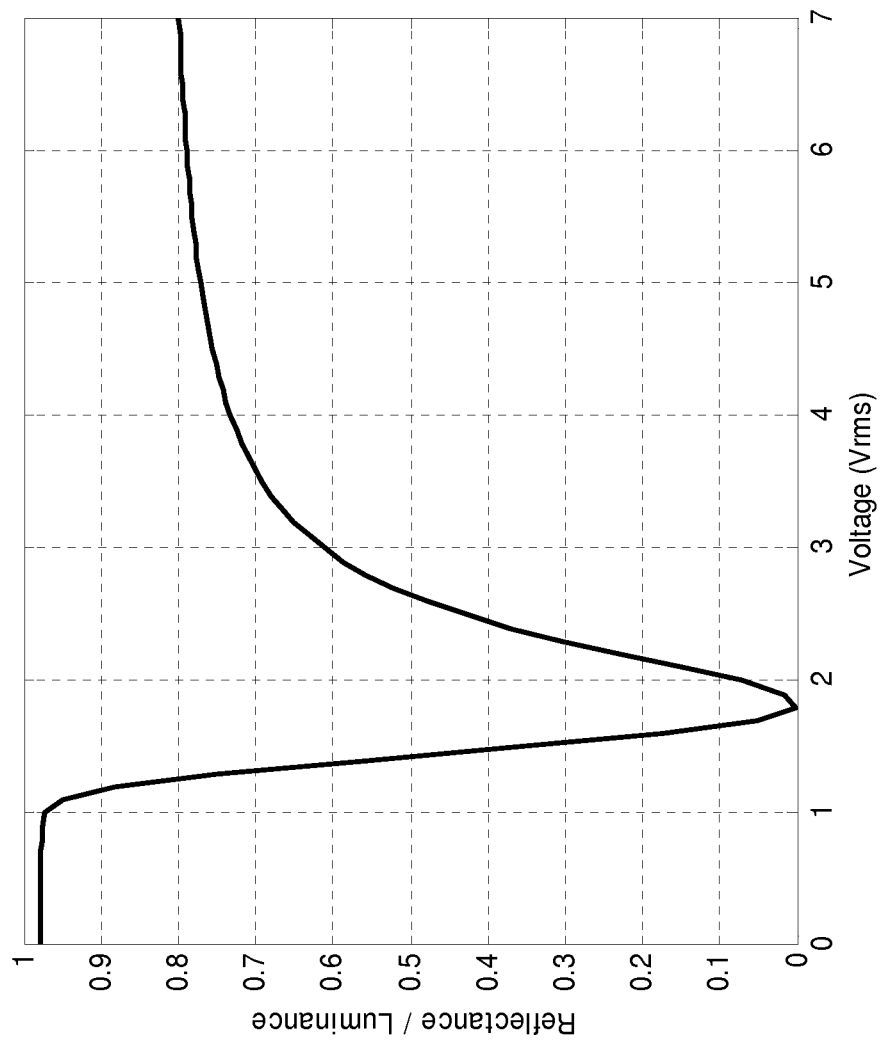

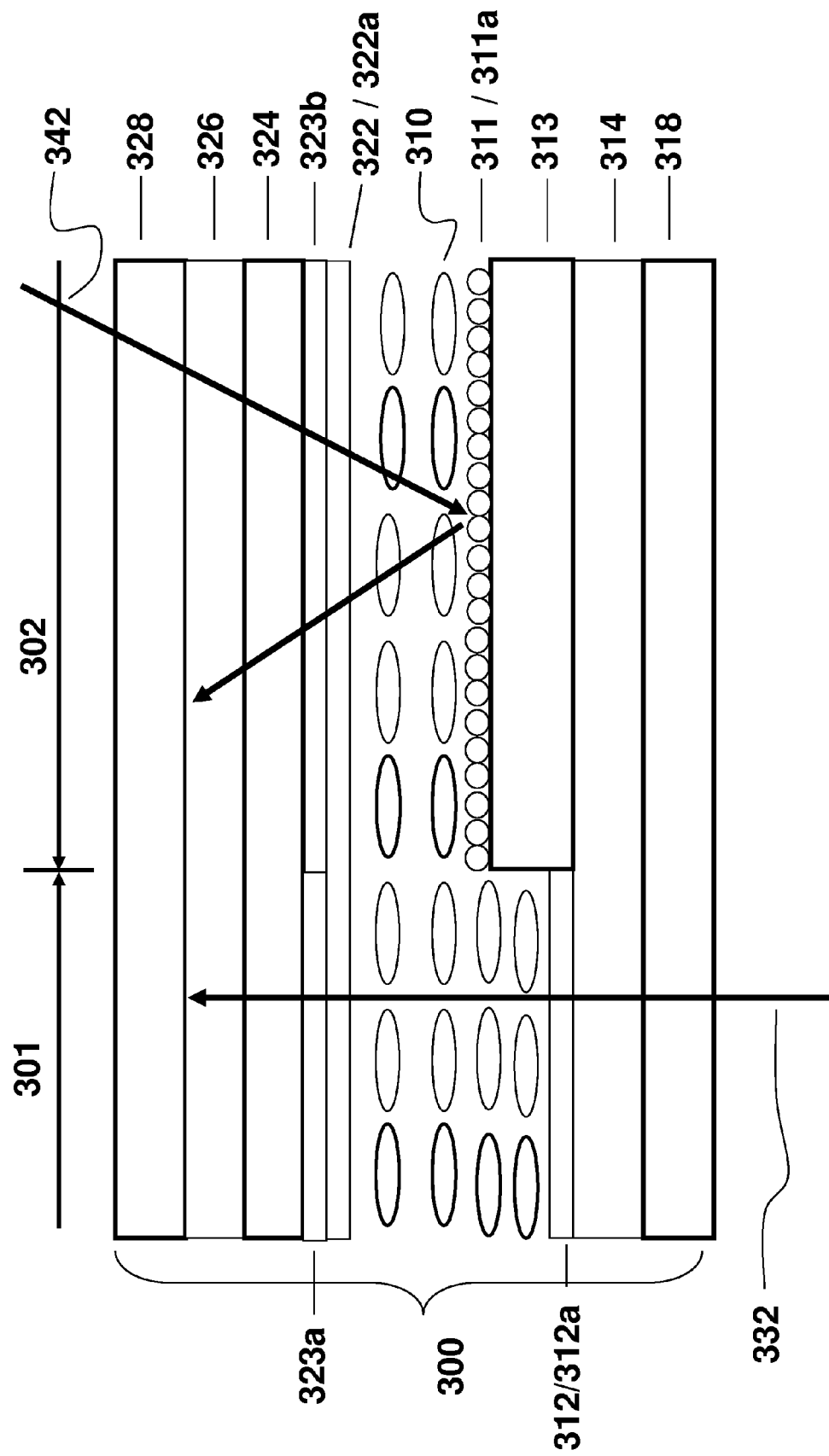

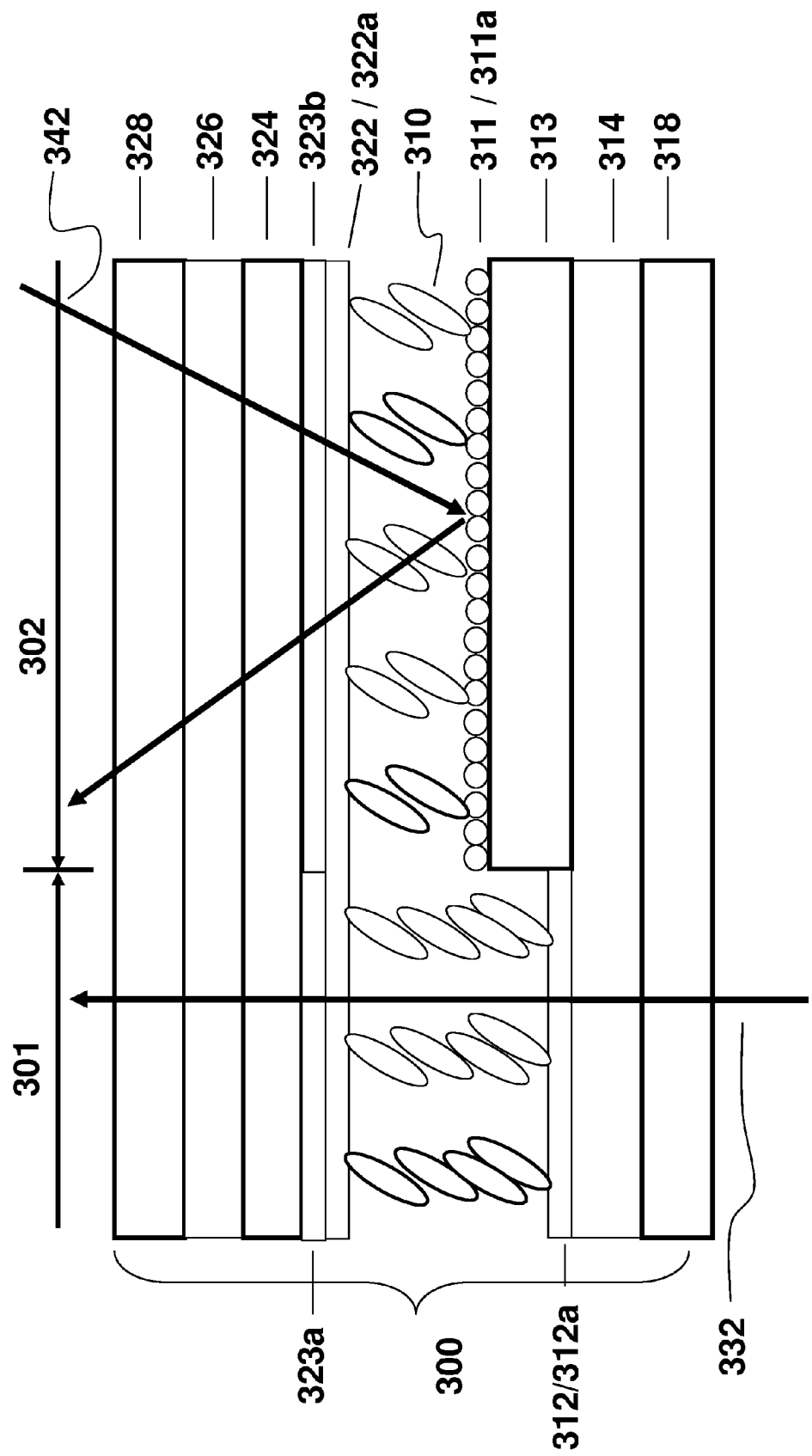

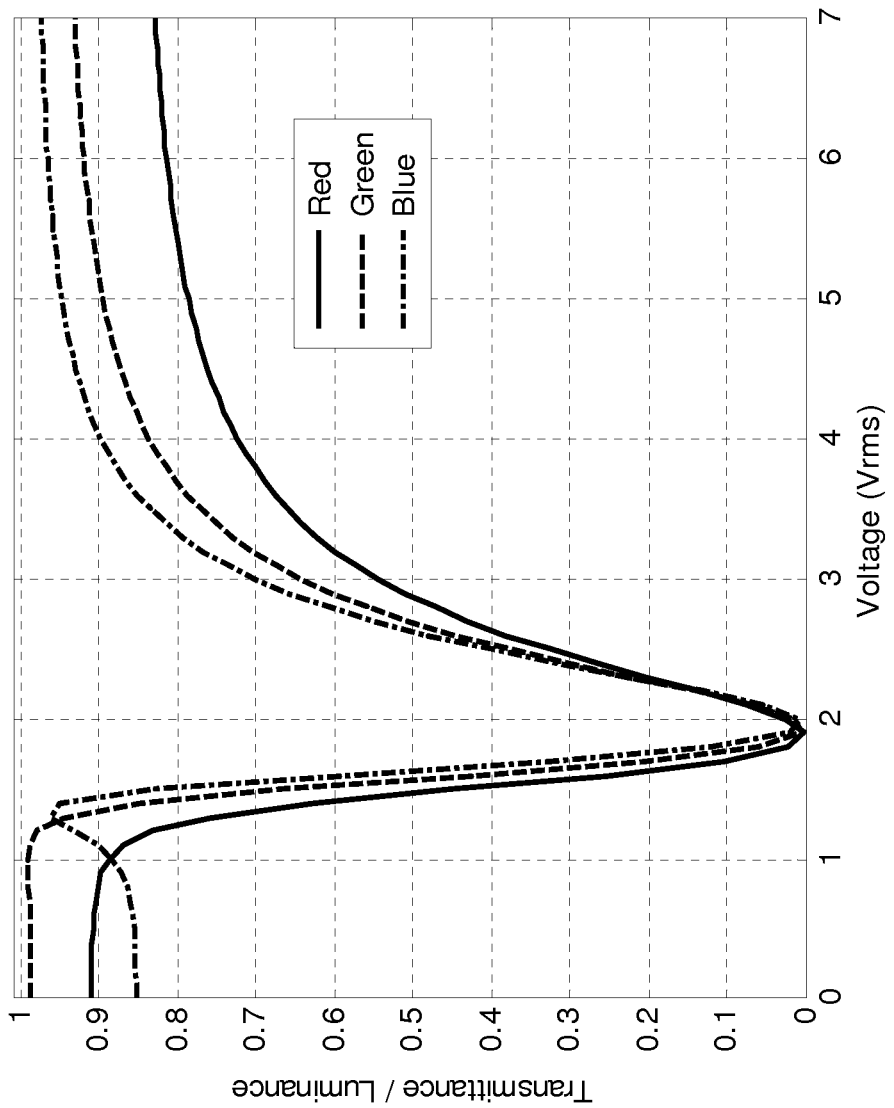

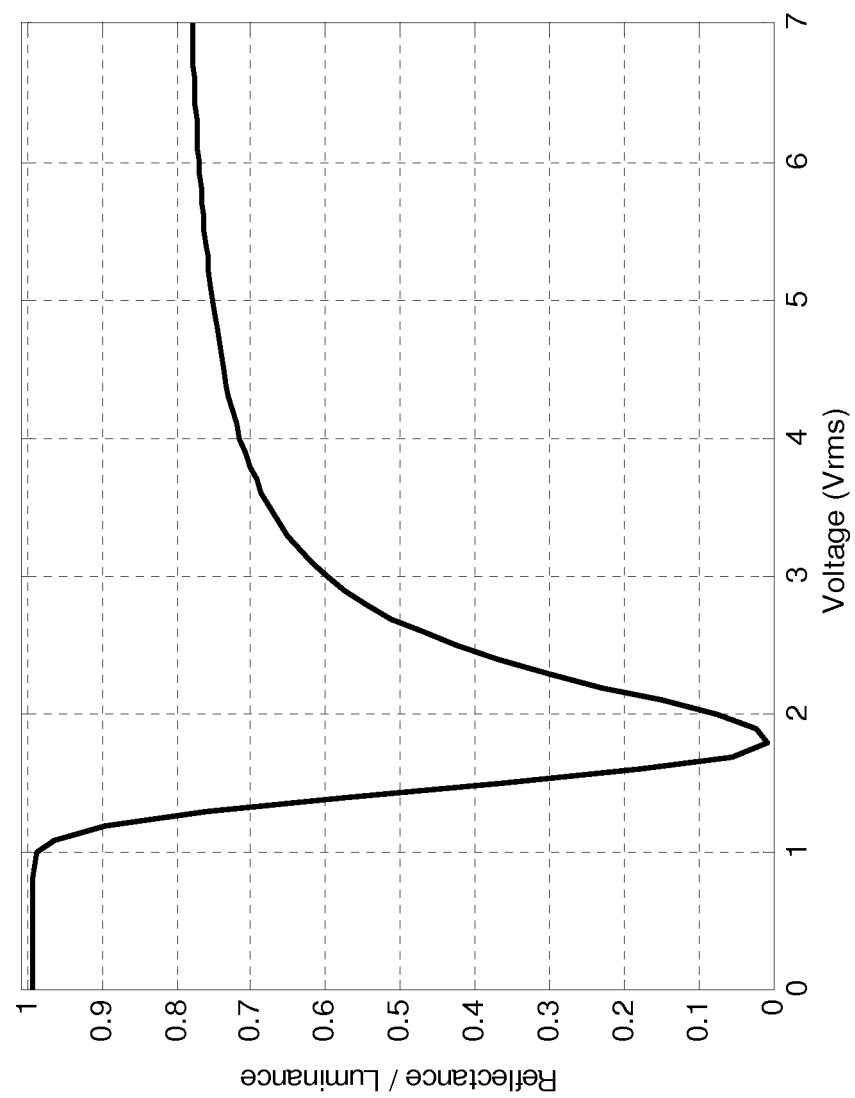

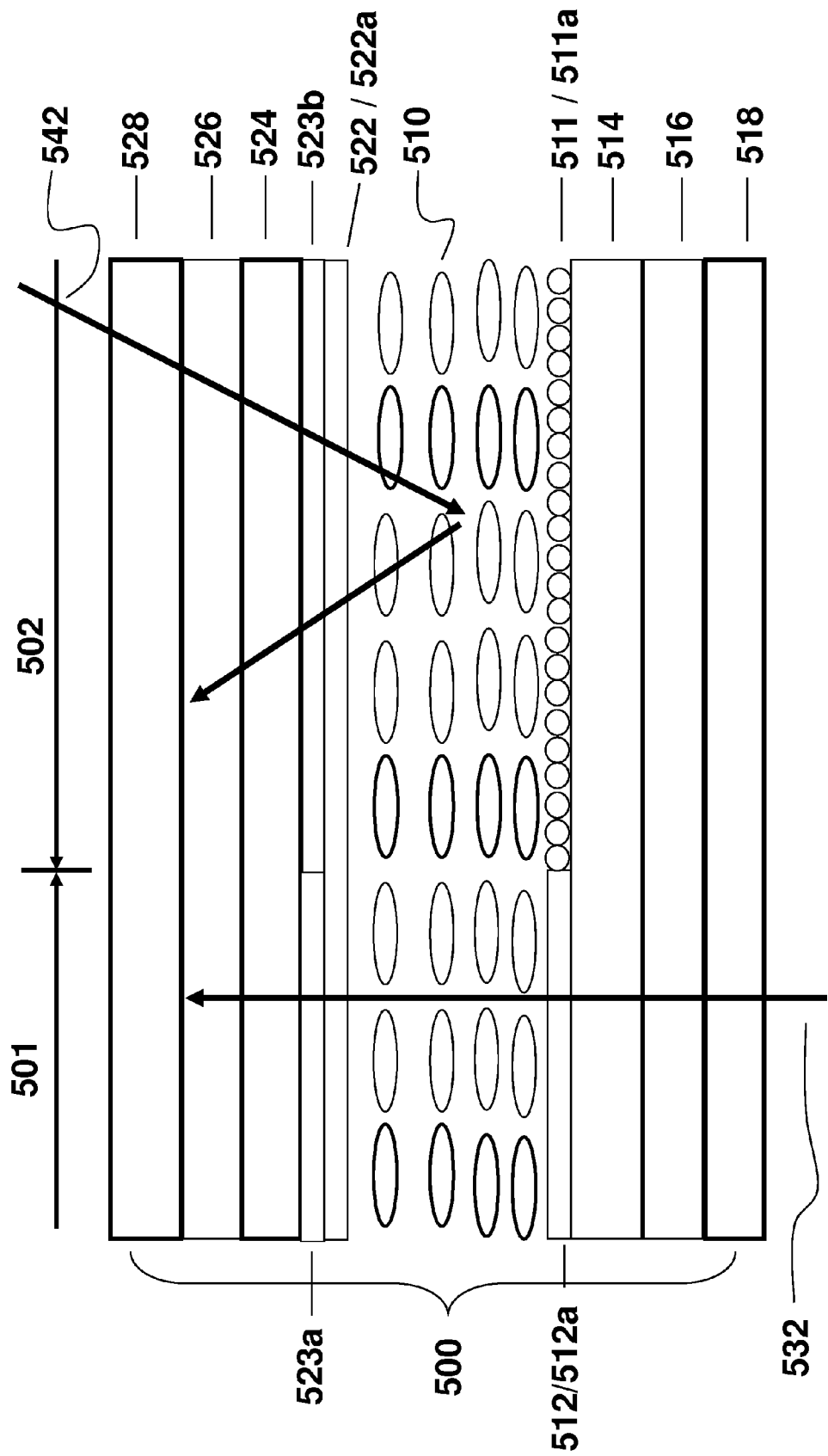

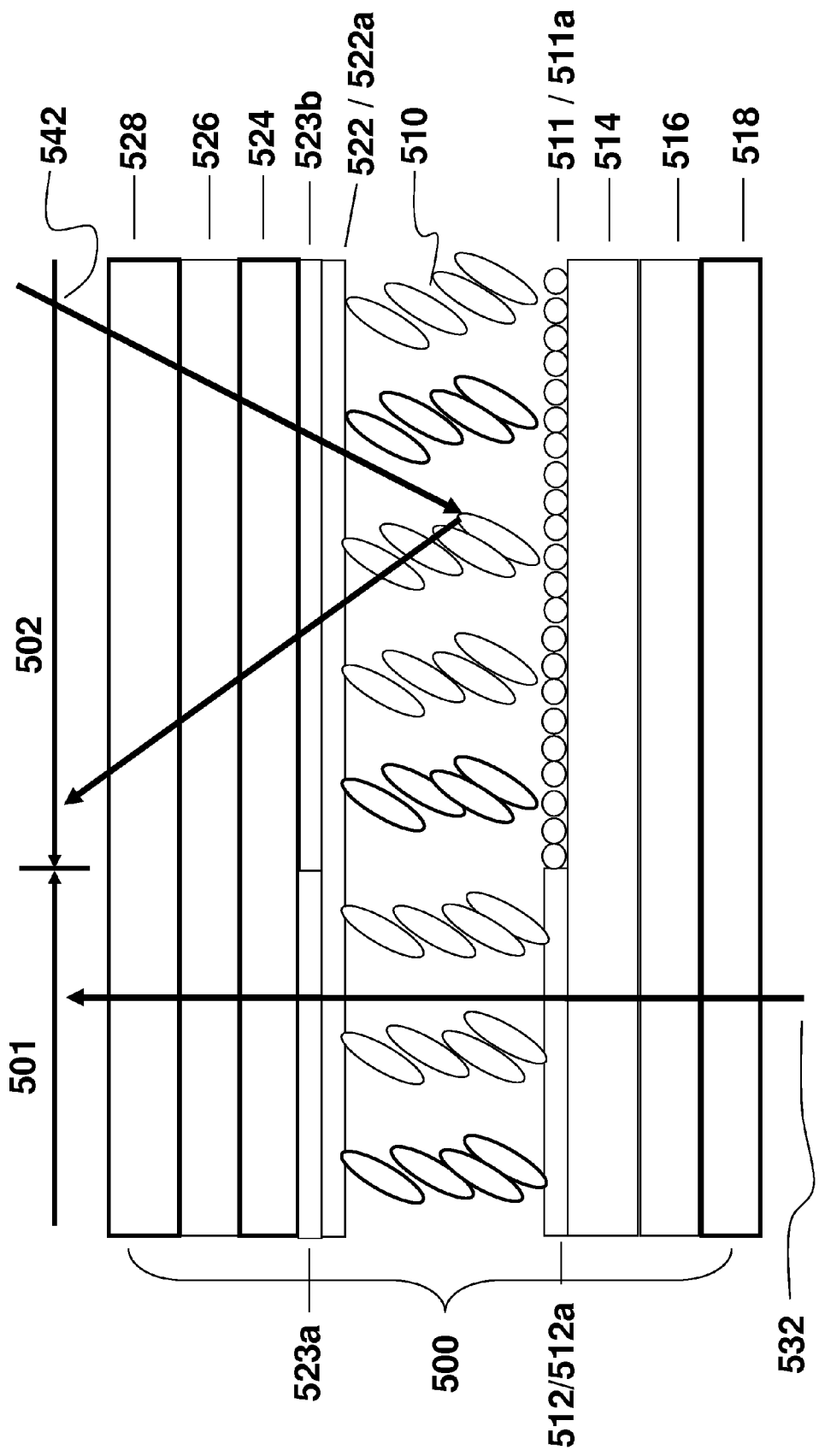

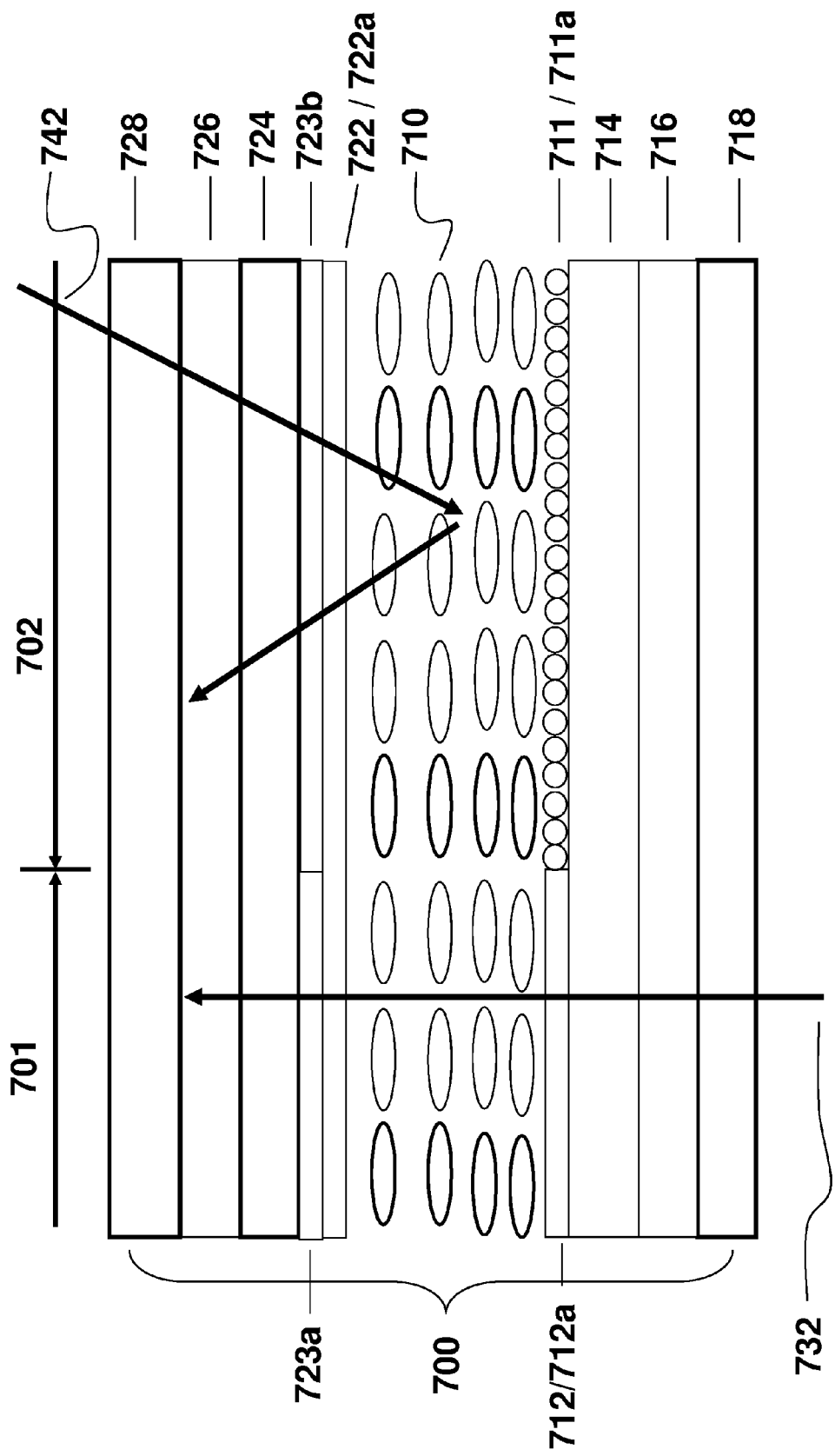

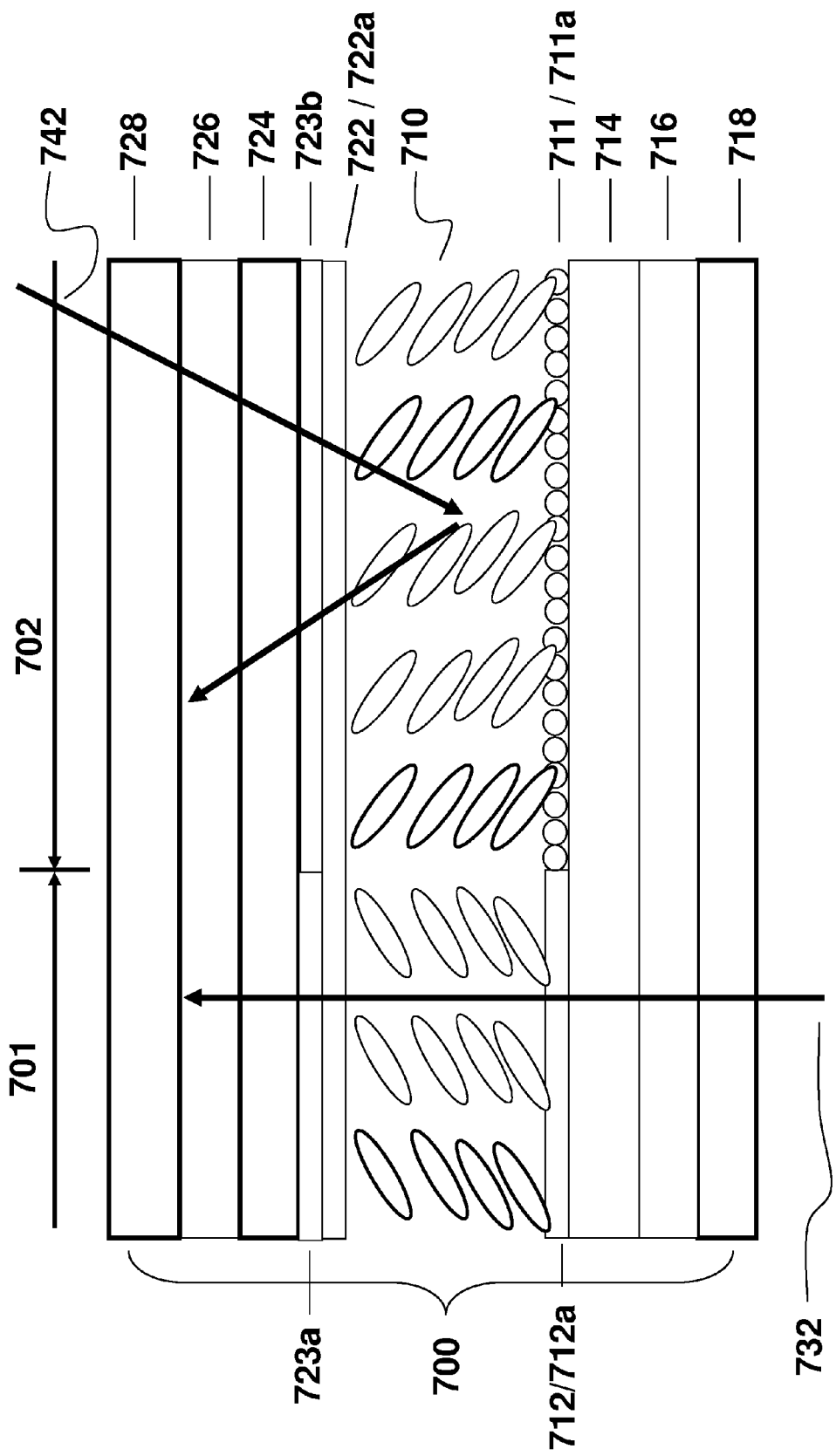

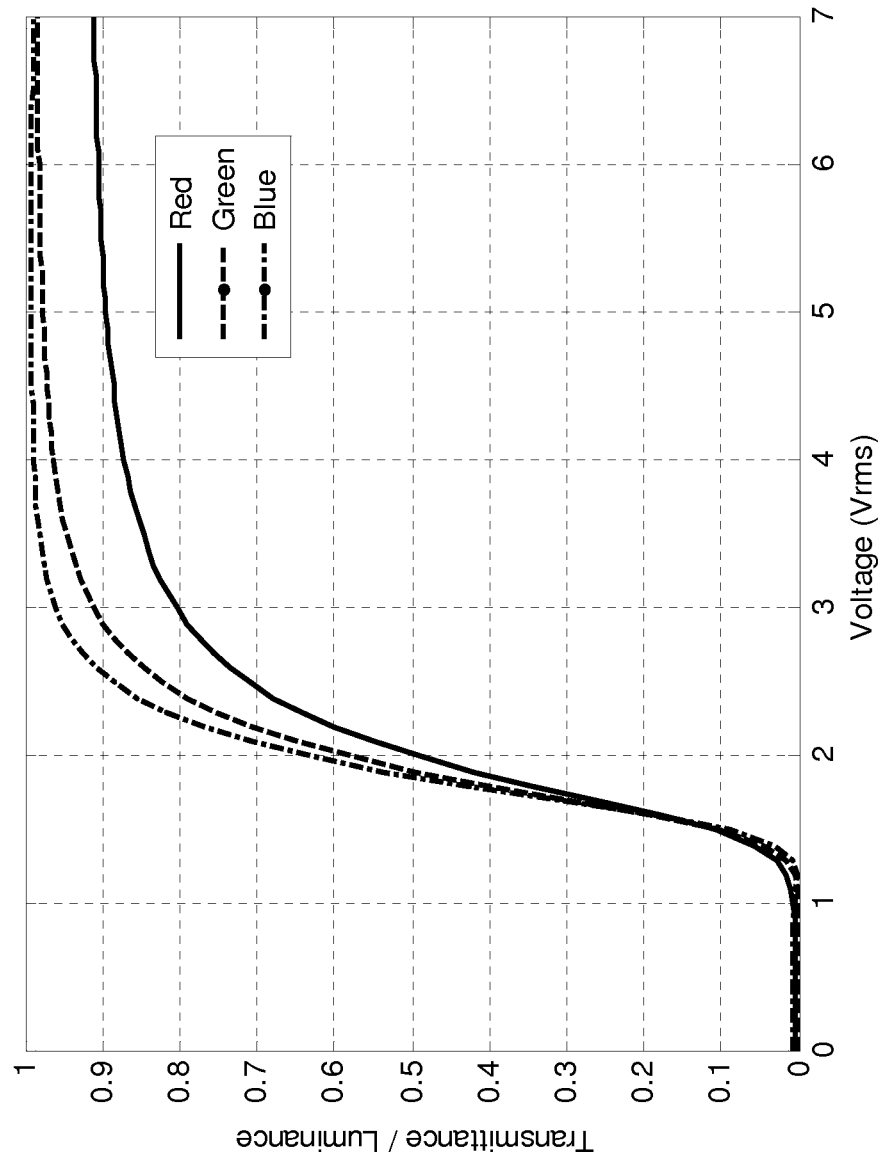

LOW POWER CONSUMPTION TRANSFLECTIVE LIQUID CRYSTAL DISPLAYS

CROSS REFERENCE TO RELATED APPLICATIONS

This application is related to U.S. patent application Ser. No. 12/560,217, filed Sep. 15, 2009, the entire contents of which are hereby incorporated by reference for all purposes as if fully disclosed herein.

TECHNICAL FIELD

The present disclosure relates to Liquid Crystal Displays (LCDs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transflective LCDs may be used in cell phones, electronic books, and computers in part because reading transflective LCDs typically is possible in strong ambient lighting. A transflective LCD comprises an array of pixels or sub-pixels each having a reflective part and a transmissive part and may operate in different modes.

Under some approaches, a normally black transflective LCD may need a driving voltage higher than 5 Vrms ("root mean square") to obtain high transmittance and reflectance, thereby requiring relatively high power consumption.

Under some other approaches, a normally white (NW) transflective LCD utilizing the electrically controlled birefringence effect may require a pair of wide-band quarter-wave films to realize the NW mode, which typically consists a half wave plate and a quarter-wave plate in the transmissive part, and a wide-band quarter-wave film in the reflective part. A costly nematic-hybrid retarder or similar compensation retarder is often required to achieve the dark state with voltage-on for a thin film transistor (TFT) driver under these approaches. The driving voltage is typically higher than 3.0 Vrms, thereby requiring relatively high power consumption.

In addition, the NW transflective LCD may comprise a liquid crystal layer working as a quarter-wave plate, which requires relatively tight and accurate cell gap control in manufacturing processes, thereby reducing the yield and increasing the cost in the manufacturing processes.

BRIEF DESCRIPTION OF THE DRAWINGS

In the drawings:

FIG. 1A and FIG. 1B illustrate a schematic partial cross-sectional view of an example normally white transflective LCD sub-pixel.

FIG. 2A and FIG. 2B illustrate transmittance and reflectance of an example normally white transflective LCD sub-pixel.

FIG. 3A and FIG. 3B illustrate a schematic partial cross-sectional view of another example normally white transflective LCD sub-pixel.

FIG. 4A and FIG. 4B illustrate transmittance and reflectance of another example normally white transflective LCD sub-pixel.

FIG. 5A and FIG. 5B illustrate a schematic partial cross-sectional view of an example normally white transflective LCD sub-pixel.

FIG. 7A and FIG. 7B illustrate a schematic partial cross-sectional view of an example mixed mode transflective LCD sub-pixel.

FIG. 8A and FIG. 8B illustrate transmittance and reflectance of an example mixed mode transflective LCD sub-pixel.

Figure 6A:
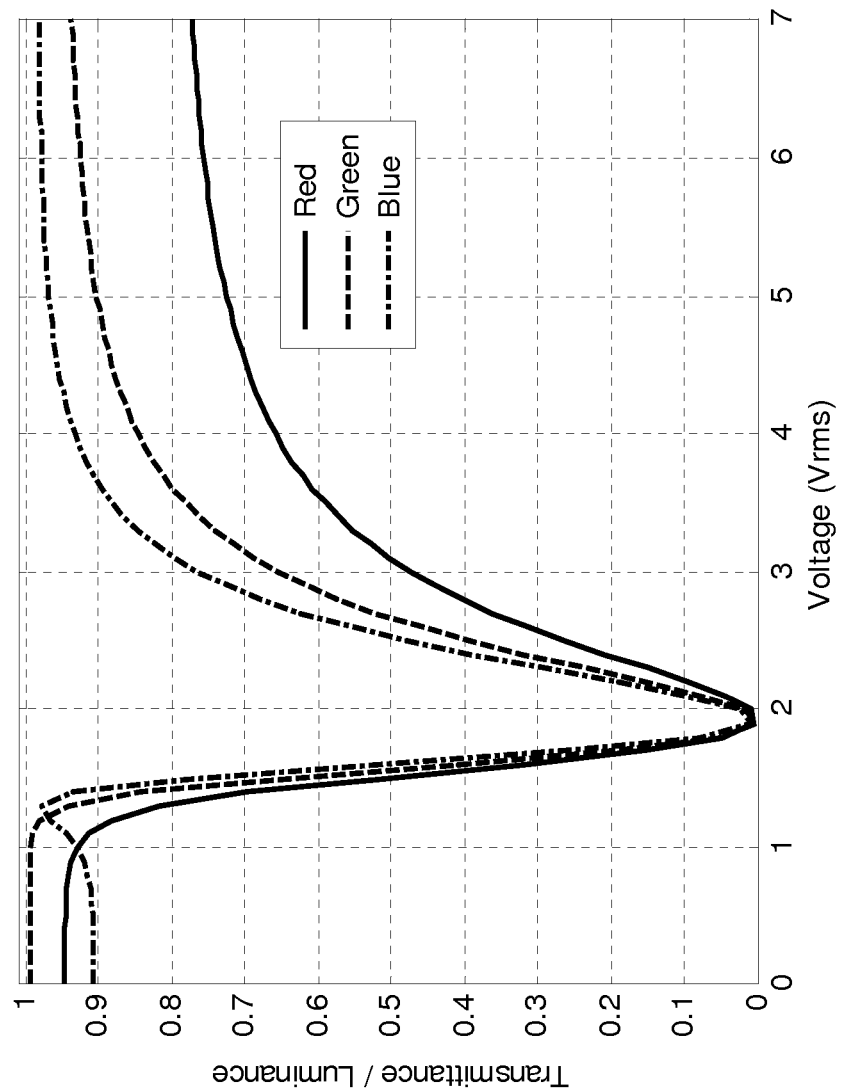
FIG. 6A and FIG. 6B illustrate transmittance and reflectance of an example normally white transflective LCD sub-pixel.

The drawings are not rendered to scale.

DETAILED DESCRIPTION

Techniques for normally white (NW) and mixed mode (MM) transflective LCDs are described. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

1. General Overview

In some embodiments, a NW or MM transflective LCD sub-pixel comprises a liquid crystal layer in a homogeneous alignment state when a voltage between electrodes is not applied or below a threshold value. The liquid crystal layer uses the electrically controlled birefringence (ECB) effect for achieving high transmittance, high reflectance, and high brightness of the transmissive part through a simplified device structure with fewer retardation films for cost saving.

Benefits of this approach include a transflective LCD with high backlight output efficiency. Additional benefits include a transflective LCD characterized by higher brightness and significantly lower power consumption. These characteristics are valuable for various applications in different operating modes. For example, the transflective LCD embodiments described herein can display color images in the transmissive mode and the transflective mode, and black-and-white monochromatic images in the reflective mode with good readability in the presence of ambient light and low power consumption.

In an embodiment, a transflective liquid crystal display comprises a plurality of sub-pixels. Each sub-pixel in the transflective liquid crystal display comprises a reflective part. The reflective part comprises: first portions of a first retardation film, a first polarizing layer, a bottom substrate layer, a top substrate layer, and a common electrode portion, wherein the top substrate layer is opposite to the bottom substrate layer; a reflective layer adjacent to the bottom substrate layer; a reflective-part liquid crystal layer portion of a liquid crystal layer between the bottom substrate layer and the top substrate layer.

The sub-pixel may also comprise a transmissive part. The transmissive part comprises: second portions of the first retardation film, the first polarizing layer, the bottom substrate layer, the top substrate layer, and the common electrode portion; a transmissive-part liquid crystal layer portion of the liquid crystal layer between the bottom substrate layer and the top substrate layer. A transmissive-part cell gap of the transmissive-part liquid crystal layer portion is configured as a plate of at least a half-wavelength or more in a voltage-off state of the transmissive-part liquid crystal layer portion.

In an embodiment, the transmissive-part liquid crystal layer portion may be configured to be driven to a transmissive display state by 1.0 volt at maximum to 2.7 volts at maximum.

In an embodiment, the reflective-part liquid crystal layer portion is configured to be driven to a reflective display state by 1.0 volt at maximum to 2.7 volts at maximum.

In an embodiment, the reflective-part liquid crystal layer portion comprises liquid crystal molecules homogeneously aligned along a second direction in the voltage-off state of the reflective-part liquid crystal layer portion.

In some embodiments, the transmissive part further comprises a portion of a second retardation film. In some other embodiments, the transmissive part does not further comprise a portion of a second retardation film.

In some embodiments, the reflective part further comprises an over-coating layer adjacent to one of the bottom substrate layer and the top substrate layer. The over-coating layer is between the bottom substrate layer and the top substrate layer. A reflective-part cell gap of the reflective-part liquid crystal layer portion is a plate of a half-wavelength or more in a voltage-off state of the reflective-part liquid crystal layer portion. In these embodiments, the cell gaps of the transmissive-part liquid crystal layer portion and the reflective-part liquid crystal layer portion may be different. In some other embodiments, a reflective-part cell gap of the reflective-part liquid crystal layer portion is equal to the transmissive-part cell gap.

In an embodiment, the reflective-part liquid crystal layer portion is configured to be driven to a reflective display state by a first voltage, while the transmissive-part liquid crystal layer portion is configured to be driven to a transmissive display state by the first voltage.

In an embodiment, the reflective-part liquid crystal layer portion is configured to be driven to a reflective display state by a first voltage, while the transmissive-part liquid crystal layer portion is configured to be driven to a transmissive display state by a second, different, voltage.

In an embodiment, the sub-pixel further comprises at least one color filter that covers at least a portion of the transmissive part sub-pixel.

In an embodiment, the sub-pixel is a part of a composite pixel. The composite pixel comprises another sub-pixel that is configured to express a different color than the sub-pixel.

In an embodiment, a normal direction of the bottom substrate layer is parallel to the first direction or to the second direction.

In an embodiment, the sub-pixel further comprises one or more orientation films and wherein one or more of the first direction and the second direction are along a rubbing direction of at least one of the one or more orientation films.

In an embodiment, optical birefringence of the liquid crystal layer is electrically controllable.

In an embodiment, the first retardation film has an azimuth angle of $\theta h$, while the transmit-part liquid crystal layer portion has an azimuth angle of $\theta q$. The azimuth angles satisfy one of the expressions $60 \leq 4\theta h - 2\theta q \leq 120$, or $-120 \leq 4\theta h - 2\theta q \leq -60$.

In an embodiment, the reflective part comprises a reflective electrode, while the transmissive part comprises a transmissive electrode. The sub-pixel comprises a switching element that is configured to control whether the reflective electrode is electrically connected to the transmissive electrode.

In an embodiment, the reflective part comprises a reflective electrode, while the transmissive part comprises a transmissive electrode. The common electrode is located on a first side of the liquid crystal layer, while the transmissive electrode and the reflective electrode are located on a second opposing side of the liquid crystal layer.

In an embodiment, the sub-pixel further comprises a light recycling film between the bottom substrate layer and a backlight unit that redirects backlight from the reflective part to the transmissive part. The light recycling film is configured to turn incident light of any polarized state into redirected light with a particular polarization state.

In an embodiment, the transmissive part liquid crystal layer portion comprises homogeneously aligned liquid crystal molecules.

In some embodiments, a transflective LCD as described herein forms a part of a computer, including but not limited to a laptop computer, netbook computer, cellular radiotelephone, electronic book reader, point of sale terminal, desktop computer, computer workstation, computer kiosk, or computer coupled to or integrated into a gasoline pump, and various other kinds of terminals and display units.

In some embodiments, a method comprises providing a transflective LCD as described, and a backlight source to the transflective LCD.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Overview 2.1. NW Sub-Pixel with Different Cell Gaps

FIG. 1A illustrates a schematic cross-sectional view of an example NW transflective LCD sub-pixel 100 in a voltage-off state. As used in this disclosure, "a transflective LCD sub-pixel in a voltage-off state" means the sub-pixel is in a state in which a voltage is not applied to a liquid crystal layer in the sub-pixel or even if applied, is below a threshold value to cause a deviation from the state of the liquid crystal layer when the voltage is not applied. The term "transflective LCD sub-pixel" may refer to a pixel or a sub-pixel in the transflective LCD. The LCD sub-pixel 100 may comprise two or more parts. As illustrated, the LCD sub-pixel 100 comprises a transmissive part 101 and a reflective part 102.

The LCD sub-pixel 100 comprises a layer 110 of homogeneously aligned liquid crystal material. The liquid crystal layer 110 may be filled into a cell space by a capillary effect or a one-drop filling process under the vacuum condition. In some embodiments, the liquid crystal layer 110 is of a positive dielectric anisotropy type with $\Delta \epsilon > 0$. In some embodiments, the liquid crystal layer 110 is of a negative dielectric anisotropy type with $\Delta \epsilon < 0$.

The transmissive part 101 may have a different liquid crystal cell gap than that of the reflective part 102. As used in this disclosure, "a liquid crystal cell gap" refers to the thickness of the liquid crystal layer in either the transmissive part or the reflective part. In some embodiments, the LCD sub-pixel 100 comprises an over-coating layer 113 on or near a bottom substrate layer 114 in the reflective part 102. The over-coating layer 113 may be formed in a plurality of partially etched regions by a photolithographic etching process. In some embodiments, in part due to the over-coating layer 113, the liquid crystal cell gap in the reflective part 102 may be approximately half of the liquid crystal cell gap in the transmissive part 101. In various embodiments, the over-coating layer 113 may comprise acrylic resin, polyamide, or novolac epoxy resin.

The inner surface, which is the top surface in FIG. 1A, of over-coating layer 113 may be covered with a metallic reflective layer 111 such as aluminum (Al) or silver (Ag) to work as a reflective electrode 111*a*. In some embodiments, this metallic reflective layer 111 may be a bumpy metal layer.

The bottom substrate layer 114 may be made of glass. On the inner surface, which faces the liquid crystal layer 100, of the bottom substrate 114 in the transmissive part 101, a transparent indium-tin oxide (ITO) layer 112 may be provided as a pixel electrode 112a.

One, two, or more color filters 123a may be deposited on or near a surface of a top substrate 124. The color filters may cover both the transmissive part 101 and the reflective part 102, or only cover the transmissive part 101. If two or more color filters are used to cover some portions of the sub-pixel, the color filters may impart different colors. In some embodiments, at least one of the color filters covers the transmissive part 101. There may be red, green and blue (RGB) color filters 123a deposited on or near the inner surface, which faces the liquid crystal layer 110, of the top substrate 124 in the transmissive part 101. In areas that are not covered by the color filters 123a, a second over-coating layer 123b may be configured. The second over-coating layer 123b may be a passivation layer comprising an organic material such as a-Si:C:O and a-Si:O:F, or an inorganic material such as silicon nitride (SiNx) and silicon oxide (SiO2), prepared by plasma enhanced chemical vapor deposition or other similar sputtering methods.

An ITO layer 122 may be located between the top substrate 124 and the liquid crystal layer 110 as a common electrode 122a. In some embodiments, this ITO layer 122 covers the whole area of the LCD sub-pixel.

A bottom linear polarizer 118 and a top linear polarizer 128 with substantially the same polarization axis may be attached on outer surfaces of the bottom substrate 114 and top substrate 124 respectively.

A switch element in the sub-pixel 100 may be used to control whether the reflective electrode 111a is connected or disconnected with the pixel electrode 112a in the transmissive part 101. For example, in some operating modes of a transflective LCD display comprising the LCD sub-pixel 100, the switch element under display mode control logic may cause the reflective electrode 111a to be connected to the pixel electrode 112a; the electrodes 111a and 112a thus may be driven by a same signal to cause the transmissive part 101 and the receiver part 102 to simultaneously express a same pixel or sub-pixel value in tandem. In some other operating modes, the switch element under display mode control logic may cause the reflective electrode 111a to be disconnected from the pixel electrode 112a; the electrodes 111a and 112a may thus be driven by separate signals to cause the transmissive part 101 and the receiver part 102 to independently express different pixel or sub-pixel values. For example, in a transmissive operating mode, the transmissive part 101 may be set according to a pixel or sub-pixel value based on image data, while the receiver part 102 may be set in a dark black state. In a reflective operating mode, on the other hand, the reflective part 102 may be set according to a pixel or sub-pixel value based on image data, while the transmissive part 101 may be set in a dark black state.

In some embodiments, reflective-part liquid crystal layer portion and transmissive-part liquid crystal layer portion may be driven with the same voltage range values. However, even so, different voltage values may be concurrently and separately applied to a reflective-part liquid crystal layer portion in the reflective part 102 and to a transmissive-part liquid crystal layer portion in the transmissive part 101. In some other embodiments, reflective-part liquid crystal layer portion and transmissive-part liquid crystal layer portion may be driven with by two separate ranges of voltage values. Thus, in these other embodiments, a first voltage range values may be used to drive the reflective-part liquid crystal layer portion in the reflective part 102, while a second different voltage range values may be used to drive the transmissive-part liquid crystal layer portion in the transmissive part 101.

The switch element may be implemented by one or more thin-film transistors (TFTs) hidden beneath the metallic reflective layer 111 in the reflective part 102 to improve the aperture ratio of the transflective LCD.

In some embodiments, in the voltage-off state, the homogeneously aligned liquid crystal material layer 110 may be aligned in a direction such that the liquid crystal layer 110 in the transmissive part 101 is substantially a one-wave plate, while the liquid crystal layer 110 in the reflective part 102 is substantially a half-wave plate. In some embodiments, longer than a one-wave plate may be used in the liquid crystal layer 110 in the transmissive part. For example, a one-and-a-half-wave, two-wave, two-and-a-half, etc., plate may be used in the liquid crystal layer 110 in the transmissive part. In some embodiments, longer than a half-wave plate may be used in the liquid crystal layer 110 in the reflective part. For example, a one-wave, one-and-a-half-wave, two-wave, two-and-a-half, etc., plate may be used in the liquid crystal layer 110 in the reflective part.

In different embodiments, liquid crystal materials with different birefringence properties may be used in the liquid crystal layer 110.

In some embodiments, rubbed polyimide layers, not shown in FIG. 1A, may be formed between one of ITO layers 112, 122, and the metallic reflective layer 111 and the liquid crystal layer 110 to induce the liquid crystal layer 110 near a rubbed polyimide layer to be homogeneously aligned along a rubbing direction in parallel with the planar surfaces of the substrate layers 114 and 124.

In some embodiments, a first half-wave retardation film 116 is arranged in between the first polarizer 118 and the bottom substrate 114, while a second half-wave retardation film 126 is arranged in between the second polarizer 128 and the top substrate 124. Slow axis directions of the first and second half-wave retardation films 116 and 126 may be substantially along a same direction in the transmissive part 101. Since the liquid crystal layer 110 is a one-wave plate in the voltage-off state, backlight 132 from a backlight unit (BLU) with a first polarization state when entering the first half-wave retardation film 116 produces a light with the same first polarization state when exiting the second half-wave retardation film 126. The light with the first polarization state passes through the polarization layer 128. This produces a normally white liquid crystal mode for the transmissive part 101 of the LCD sub-pixel 100.

In the reflective part 102, the light path of ambient light 142 crosses the liquid crystal layer 110 twice. Since the liquid crystal layer 110 in the reflective part 102 is a half-wave plate in the voltage-off state, the total effect of the liquid crystal layer 110 relative to the light path of the ambient light 142 is a one-wave plate. Under a similar analysis to that for the transmissive part 101, the ambient light 142 reflects through the reflective part 102. Thus, a normally white liquid crystal mode for the reflective part 102 of the LCD sub-pixel 100 is also produced.

In some embodiments, azimuth angles of the first half-wave retardation film 116 and the second half-wave retardation film 126 are the same, for example, θh. In the voltage-off state, the one-wave plate formed by the liquid crystal layer 110 in the transmissive part 101 can be considered as a pair of half-wave plates; azimuth angles of the half-wave plates in the pair are also the same, for example, θq. The first half-wave retardation film 116 and one of the half-wave plate form a one-wave plate, while the second half-wave retardation film 126 and the other of the half-wave plates form another one-wave plate. Thus, the optical configuration of the transmissive part 101 comprises two one-wave plates as described.

Similarly, in the reflective part 102, only the second half-wave retardation film 126 and the liquid crystal layer 110 are in the optical path of the ambient light 142. As noted, in the voltage-off state, the liquid crystal layer 110 in the receiver part 102 is a half-wave plate. The azimuth angles of the second half-wave retardation film 126 and the liquid crystal layer 110 are θh and θq, respectively. Since the optical path of the ambient light 142 crosses the second half-wave retardation film 126 and the liquid crystal layer 110 twice, the optical configuration of the reflective part 102 effectively also comprises two one-wave with the same azimuth angles θh and θq. Depending on a choice of an optimized central wavelength in the visible range from 380 nm to 780 nm, a retardation value of the one-wave plates may be configured with a value from 300 nm to 900 nm.

In some embodiments, the azimuth angles θh and θq may be configured to satisfy one of the two relationships as follows:

$$60 \leq 4\theta h - 2\theta q \leq 120, \quad \text{(Rel. 1a)}$$

or $$-120 \leq 4\theta h - 2\theta q \leq -60 \quad \text{(Rel. 1b)}$$

In some embodiments, to realize a pair of achromatic one-wave plates in both the transmissive and reflective part, the azimuth angles θh and θq may be configured to substantially satisfy the following relationship:

$$4\theta h - 2\theta q = \pm 90. \quad \text{(Rel. 2)}$$

To reduce the color dispersion of the liquid crystal layer 110 in the voltage-off state, θq may be configured to be 0° or 90° aligning with the rubbing direction, which is the liquid crystal orientation direction, with an angular variation of ±5°. In some embodiments, θh is set at around ±67.5° based on the relationship Rel.2. Since the polarizer pair is aligned parallel instead of perpendicular to each other, since the optical configurations of the transmissive part 101 and the reflective part 102 substantially coincide, the LCD sub-pixel 100 exhibits a better gamma curve matching ability between the transmissive and reflective modes than otherwise.

FIG. 1B illustrates a schematic cross-sectional view of the example NW transflective LCD sub-pixel 100 in a voltage-on state. As used in this disclosure, "a transflective LCD sub-pixel in a voltage-on state" means the sub-pixel in a state in which a voltage is applied to a liquid crystal layer in the sub-pixel above a threshold value to cause a deviation from the state of the liquid crystal layer when the voltage is not applied.

As illustrated in FIG. 1B, in the transmissive part 101, in the voltage-on state, the homogenously aligned LC material 110 will be tilted up by an ECB effect due to dielectric anisotropy of the liquid crystal material in layer 110. The tilting of the liquid crystal material in layer 110 induces an optical anisotropic change. This change may cause the liquid crystal layer 110 in the transmissive part 101 no longer to be a one-wave plate. Consequently, in the voltage-on state, a portion of the backlight 132 may pass through the polarization layers 118 and 128 to show one of a plurality of brightness levels (or display states) in the transmissive part 101, depending on which of a plurality of voltages, in a first voltage range, applied across the transmissive-part liquid crystal layer portion. The plurality of brightness levels for the transmissive part 101 may include a dark black state in the transmissive part 101 effectuated at one of the plurality of voltages, in the first voltage range, across the transmissive-part liquid crystal layer portion. In some embodiments, the first voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the first voltage range may be a voltage between 1.0 and 2.5 volts. Thus, the transmissive part of a sub-pixel as described herein may be operated with a low voltage maximum for an operational range, for example, the first voltage range.

Similarly, in the reflective part 102, in the voltage-on state, the LC material 110 will be tilted up by an ECB effect due to dielectric anisotropy of the liquid crystal material in layer 110. The tilting of the liquid crystal material in layer 110 induces an optical anisotropic change. This change may cause the liquid crystal layer 110 in the reflective part 102 no longer to be a half wave plate. Consequently, in the voltage-on state, the ambient light 142 can now be reflected off from the metallic reflective layer 111 to various extents to show one of a plurality of brightness levels (or display states) in the reflective part 102, depending on which of a plurality of voltages, in a second voltage range, applied across the reflective-part liquid crystal layer portion. The plurality of brightness levels for the reflective part 102 may include a dark black state in the reflective part 102 effectuated at one of the plurality of voltages, in the second voltage range, across the reflective-part liquid crystal layer portion. In some embodiments, the second voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the second voltage range may be a voltage between 1.0 and 2.5 volts. Thus, the reflective part as described herein may be operated with a low voltage at maximum.

The voltage-on state of the transmissive part 101 and the voltage-on state of the reflective part 102 may be independently set. For example, when the reflective electrode 111a is connected to the transmissive electrode 112a, both the transmissive part 101 and the reflective part 102 may be set to a correlated brightness state. When the reflective electrode 111a is disconnected to the transmissive electrode 112a, the transmissive part 101 may be set to a first brightness state while the reflective part 102 may be set to a second different brightness state.

The operational voltage across the transmissive-part liquid crystal layer portion and the operational voltage across the reflective-part liquid crystal layer portion may be independently set. In some embodiments, the first voltage range for the transmissive-part liquid crystal layer portion may be different from the second voltage range for the reflective-part liquid crystal layer portion. For example, when the reflective-part liquid crystal layer portion is driven by a voltage of 3.5 volts in the second voltage range from 2 to 4 volts, the transmissive-part liquid crystal layer portion may be driven by a voltage of 1.5 volts in the first voltage range from 0 to 2 volts.

In some embodiments, color images can be displayed in combination with the R.G.B. color filters 123a in the transmissive part 101 in the transmissive or transflective operating modes, while black and white monochromic images can be shown in the reflective part 102 since there are no color filters on this region in the reflective operating modes.

In some embodiments, parameters for the liquid crystal layer may be, but are not limited to: birefringence Δn ranging from 0.05 to 0.30 at the wavelength of 589.3 nm, dielectric anisotropy Δ∈ ranging from +4.0 to +20.0 at the frequency of 1000 Hz, and rotational viscosity γ1 ranging from 0.50 to 2.50 Pa·s at a typical temperature of 20° C. An area ratio may, but is not limited to, range from 10:90 to 40:60 between the transmissive part and the reflective part.

Since the liquid crystal layer in the NW transflective sub-pixel is configured to generate a phase retardation of at least one wave in the voltage-off state, a dark state appears at a relatively low driving voltage in the voltage-on state. In some embodiments, the maximum voltage in a first voltage range to drive the transmissive-part liquid crystal layer portion may be configured as the relatively low driving voltage that produces the dark state for the transmissive part 101, while the maximum voltage in a second voltage range to drive the reflective-part liquid crystal layer portion may be configured as the relatively low driving voltage that produces the dark state for the reflective part 102.

In an exemplary embodiment, parameters for the liquid crystal layer are: birefringence $\Delta n=0.1093$, dielectric anisotropy $\Delta \in =9.1$ and rotational viscosity $\gamma 1=0.201$ Pa·s. The liquid crystal layer has homogenous alignment in the initial voltage-off state. The azimuth angle $\theta h$ for the liquid crystal layer is 0°. The pre-tilt angle for the liquid crystal layer is within 3°. Table 1 shows additional parameters for the LCD sub-pixel in the embodiment, with an area ratio 30:70 between the transmissive part and the reflective part.

TABLE 1

| Components | | Example value |
|---|---|---|
| Top polarization layer | absorption axis (°) | 0 |
| Top half-wave film | slow axis direction (°) | 67.5 |
| | phase retardation (nm) | 275 |
| LC layer in transmissive part | alignment direction (°) | 0 |
| | cell gap (μm) | 5.0 |
| LC layer in reflective part | alignment direction (°) | 0 |
| | cell gap (μm) | 2.52 |
| Bottom half-wave film | slow axis direction (°) | 67.5 |
| | phase retardation (nm) | 275 |
| Bottom polarization layer | absorption axis (°) | 0 |

In some embodiments, the top and bottom half-wave retardation films 116 and 126 are made of either single-axis or biaxial retarders.

FIG. 2A plots the maximum normalized transmittance for the LCD sub-pixel with the above example parameter values at the voltage-off state is 94.65%, 99.37% and 90.58% to the RGB primaries for white LED backlight, respectively. The dark state appears at 1.9 Vrms.

FIG. 2B shows the maximum normalized reflectance for the LCD sub-pixel with the above example parameter values at the voltage-off state is 97.67% to D65 sunlight as the ambient light. The dark state appears at 1.8 Vrms.

Therefore, a NW transflective LCD as described herein can be driven at low driving voltage below 2.0 Vrms for less power consumption, and has high transmittance and reflectance in the respective transmissive and reflective modes.

In some embodiments, the transmissive and reflective parts have a similar voltage-dependent transmittance/reflectance steepness and close voltage points to get the dark state. As a result, the NW transflective sub-pixel has a good gamma-matching for the transmissive and reflective parts. In some embodiments, a better optical performance may be achieved by fine-tune driving voltages at the different ambient light or BLU conditions either through a single voltage range or two voltage ranges across the liquid crystal layers for the transmissive and reflective parts.

2.2. NW Sub-Pixel with Few Retarders

FIG. 3A illustrates a schematic cross-sectional view of an example NW transflective LCD sub-pixel 300 in a voltage-off state. The LCD sub-pixel 300 may comprise two or more parts. As illustrated, the LCD sub-pixel 300 comprises a transmissive part 301 and a reflective part 302.

The LCD sub-pixel 300 comprises a layer 310 of homogeneously aligned liquid crystal material. The liquid crystal layer 310 may be filled into a cell space by a capillary effect or a one-drop filling process under the vacuum condition. In some embodiments, the liquid crystal layer 310 is of a positive dielectric anisotropy type with $\Delta \in >0$. In some embodiments, the liquid crystal layer 310 is of a negative dielectric anisotropy type with $\Delta \in <0$.

The transmissive part 301 may have a different liquid crystal cell gap than that of the reflective part 302. In some embodiments, the LCD sub-pixel 300 comprises an over-coating layer 313 on or near a bottom substrate layer 314 in the reflective part 302. The over-coating layer 313 may be formed in a plurality of partially etched regions by a photo-lithographic etching process. In some embodiments, in part due to the over-coating layer 313, the liquid crystal cell gap in the reflective part 302 may be approximately half of the liquid crystal cell gap in the transmissive part 301. In various embodiments, the over-coating layer 313 may comprise acrylic resin, polyamide, or novolac epoxy resin.

The inner surface, which is the top surface in FIG. 3A, of over-coating layer 313 may be covered with a metallic reflective layer 311 such as aluminum (Al) or silver (Ag) to work as a reflective electrode 311a. In some embodiments, this metallic reflective layer 311 may be a bumpy metal layer.

The bottom substrate layer 314 may be made of glass. On the inner surface, which faces the liquid crystal layer 300, of the bottom substrate 314 in the transmissive part 301, a transparent indium-tin oxide (ITO) layer 312 may be provided as a pixel electrode 312a.

One, two, or more color filters 323a may be deposited on or near a surface of a top substrate 324. The color filters may cover both the transmissive part 301 and the reflective part 302, or only cover the transmissive part 301. If two or more color filters are used to cover some portions of the sub-pixel, the color filters may impart different colors. In some embodiments, at least one of the color filters covers the transmissive part 301. There may be red, green and blue (RGB) color filters 323a deposited on or near the inner surface, which faces the liquid crystal layer 310, of the top substrate 324 in the transmissive part 301. In areas that are not covered by the color filters 323a, a second over-coating layer 323b may be configured. This second over-coating layer 323b may be a passivation layer comprising an organic material such as a-Si:C:O and a-Si:O:F, or an inorganic material such as silicon nitride (SiNx) and silicon oxide (SiO2), prepared by plasma enhanced chemical vapor deposition or other similar sputtering methods.

An ITO layer 322 may be located between the top substrate 324 and the liquid crystal layer 310 as a common electrode 322a. In some embodiments, this ITO layer 322 covers the whole area of the LCD sub-pixel.

A bottom linear polarizer 318 and a top linear polarizer 328 with polarization angles substantially perpendicular to each other may be attached on outer surfaces of the bottom substrate 314 and top substrate 324 respectively.

A switch element in the sub-pixel 300 may be used to control whether the reflective electrode 311a is connected or disconnected with the pixel electrode 312a in the transmissive part 301. For example, in some operating modes of a transflective LCD display comprising the LCD sub-pixel 300, the switch element under display mode control logic may cause the reflective electrode 311a to be connected to the pixel electrode 312a; the electrodes 311a and 312a thus may be driven by a same signal to cause the transmissive part 301 and the receiver part 302 to simultaneously express a same pixel or sub-pixel value in tandem. In some other operating modes, the switch element under display mode control logic may cause the reflective electrode 311a to be disconnected from the pixel electrode 312a; the electrodes 311a and 312a may thus be driven by separate signals to cause the transmissive part 301 and the receiver part 302 to independently express different pixel or sub-pixel values. For example, in a transmissive operating mode, the transmissive part 301 may be set according to a pixel or sub-pixel value based on image data, while the receiver part 302 may be set in a dark black state. In a reflective operating mode, on the other hand, the reflective part 302 may be set according to a pixel or sub-pixel value based on image data, while the transmissive part 301 may be set in a dark black state.

In some embodiments, reflective-part liquid crystal layer portion and transmissive-part liquid crystal layer portion may be driven with the same voltage range values. However, even so, different voltage values may be concurrently and separately applied to a reflective-part liquid crystal layer portion in the reflective part 302 and to a transmissive-part liquid crystal layer portion in the transmissive part 301. In some other embodiments, reflective-part liquid crystal layer portion and transmissive-part liquid crystal layer portion may be driven with by two separate ranges of voltage values. Thus, in these other embodiments, a first voltage range values may be used to drive the reflective-part liquid crystal layer portion in the reflective part 302, while a second different voltage range values may be used to drive the transmissive-part liquid crystal layer portion in the transmissive part 301.

The switch element may be implemented by one or more thin-film transistors (TFTs) hidden beneath the metallic reflective layer 311 in the reflective part 302 to improve the aperture ratio of the transflective LCD.

In some embodiments, in the voltage-off state, the homogeneously aligned liquid crystal material layer 310 may be aligned in a direction such that the liquid crystal layer 310 in the transmissive part 301 is substantially a one-wave plate, while the liquid crystal layer 310 in the reflective part 302 is substantially a half-wave plate. In some embodiments, longer than a one-wave plate may be used in the liquid crystal layer 310 in the transmissive part. For example, a one-and-a-half-wave, two-wave, two-and-a-half, etc., plate may be used in the liquid crystal layer 310 in the transmissive part. In some embodiments, longer than a half-wave plate may be used in the liquid crystal layer 310 in the reflective part. For example, a one-wave, one-and-a-half-wave, two-wave, two-and-a-half, etc., plate may be used in the liquid crystal layer 310 in the reflective part.

In different embodiments, liquid crystal materials with different birefringence properties may be used in the liquid crystal layer 310.

In some embodiments, rubbed polyimide layers, not shown in FIG. 3A, may be formed between one of ITO layers 312, 322, and the metallic reflective layer 311 and the liquid crystal layer 310 to induce the liquid crystal layer 310 near a rubbed polyimide layer to be homogeneously aligned along a rubbing direction in parallel with the planar surfaces of the substrate layers 314 and 324.

In some embodiments, a half-wave retardation film 326 is arranged in between the nearby polarizer 328 and the bottom substrate 324 as shown in FIG. 3A. The slow axis direction of the half-wave retardation films 326 may be substantially arranged with an azimuth angle of 90° away from the azimuth angle of the liquid crystal layer 310. The azimuth angle of the liquid crystal layer 310 in turn may be aligned 45° in-between the perpendicular polarization angles of the polarizers 318 and 328. Since the liquid crystal layer 310 is a one-wave plate in the voltage-off state, backlight 332 from a backlight unit (BLU) enters the half-wave retardation film 326 with the same polarization state as that of the backlight when entering the liquid crystal layer 310 after passing the polarizer 318. The light is in an orthogonal polarization state after passing through the half-wave retardation film 328. The light then passes through the polarization layer 328, producing a normally white liquid crystal mode for the transmissive part 301 of the LCD sub-pixel 300.

In the reflective part 302, the light path of ambient light 342 crosses the liquid crystal layer 310 twice. Since the liquid crystal layer 310 in the reflective part 302 is a half-wave plate in the voltage-off state, the total effect of the liquid crystal layer 310 relative to the light path of the ambient light 342 is a one-wave plate. Under a similar analysis to that for the transmissive part 301, the ambient light 342 reflects through the reflective part 302. Thus, a normally white liquid crystal mode for the reflective part 302 of the LCD sub-pixel 300 is also produced.

FIG. 3B illustrates a schematic cross-sectional view of the example NW transflective LCD sub-pixel 300 in a voltage-on state.

As illustrated in FIG. 3B, in the transmissive part 301, in the voltage-on state, the homogenously aligned LC material 310 will be tilted up by an ECB effect due to dielectric anisotropy of the liquid crystal material in layer 310. The tilting of the liquid crystal material in layer 310 induces an optical anisotropic change. This change may cause the liquid crystal layer 310 in the transmissive part 301 no longer to be a one-wave plate. Consequently, in the voltage-on state, a portion of the backlight 332 may pass through the polarization layers 318 and 328 to show one of a plurality of brightness levels (or display states) in the transmissive part 301, depending on which of a plurality of voltages, in a first voltage range, applied across the transmissive-part liquid crystal layer portion. The plurality of brightness levels for the transmissive part 301 may include a dark black state in the transmissive part 301 effectuated at one of the plurality of voltages, in the first voltage range, across the transmissive-part liquid crystal layer portion. In some embodiments, the first voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the first voltage range may be a voltage between 1.0 and 2.5 volts. Thus, the transmissive part of a sub-pixel as described herein may be operated with a low voltage maximum for an operational range, for example, the first voltage range.

Similarly, in the reflective part 302, in the voltage-on state, the LC material 310 will be tilted up by an ECB effect due to dielectric anisotropy of the liquid crystal material in layer 310. The tilting of the liquid crystal material in layer 310 induces an optical anisotropic change. This change may cause the liquid crystal layer 310 in the reflective part 302 no longer to be a half wave plate. Consequently, in the voltage-on state, the ambient light 342 can now be reflected off from the metallic reflective layer 311 to various extents to show one of a plurality of brightness levels (or display states) in the reflective part 302, depending on which of a plurality of voltages, in a second voltage range, applied across the reflective-part liquid crystal layer portion. The plurality of brightness levels for the reflective part 302 may include a dark black state in the reflective part 302 effectuated at one of the plurality of voltages, in the second voltage range, across the reflective-part liquid crystal layer portion. In some embodiments, the second voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the second voltage range may be a voltage between 1.0 and 2.5 volts. Thus, the reflective part as described herein may be operated with a low voltage at maximum.

The voltage-on state of the transmissive part 301 and the voltage-on state of the reflective part 302 may be independently set. For example, when the reflective electrode 311a is connected to the transmissive electrode 312a, both the transmissive part 301 and the reflective part 302 may be set to a correlated brightness state. When the reflective electrode 311a is disconnected to the transmissive electrode 312a, the transmissive part 301 may be set to a first brightness state while the reflective part 302 may be set to a second different brightness state.

The operational voltage across the transmissive-part liquid crystal layer portion and the operational voltage across the reflective-part liquid crystal layer portion may be independently set. In some embodiments, the first voltage range for the transmissive-part liquid crystal layer portion may be different from the second voltage range for the reflective-part liquid crystal layer portion. For example, when the reflective-part liquid crystal layer portion is driven by a voltage of 3.5 volts in the second voltage range from 2 to 4 volts, the transmissive-part liquid crystal layer portion may be driven by a voltage of 1.5 volts in the first voltage range from 0 to 2 volts.

In some embodiments, color images can be displayed in combination with the R.G.B. color filters 323a in the transmissive part 301 in the transmissive or transflective operating modes, while black and white monochromic images can be shown in the reflective part 302 since there are no color filters on this region in the reflective operating modes.

In some embodiments, parameters for the liquid crystal layer may be, but are not limited to: birefringence $\Delta n$ ranging from 0.05 to 0.30 at the wavelength of 589.3 nm, dielectric anisotropy $\Delta \in$ ranging from +4.0 to +20.0 at the frequency of 1000 Hz, and rotational viscosity $\gamma 1$ ranging from 0.50 to 2.50 Pa·s at a typical temperature of 20° C. An area ratio may be, but is not limited to, range from 10:90 to 40:60 between the transmissive part and the reflective part.

Since the liquid crystal layer in the NW transflective sub-pixel is configured to generate a phase retardation of at least one wave in the voltage-off state, a dark state appears at a relatively low driving voltage in the voltage-on state. In some embodiments, the maximum voltage in a first voltage range to drive the transmissive-part liquid crystal layer portion may be configured as the relatively low driving voltage that produces the dark state for the transmissive part 301, while the maximum voltage in a second voltage range to drive the reflective-part liquid crystal layer portion may be configured as the relatively low driving voltage that produces the dark state for the reflective part 302.

In an exemplary embodiment, parameters for the liquid crystal layer are: birefringence $\Delta n=0.1093$, dielectric anisotropy $\Delta \in=9.1$ and rotational viscosity $\gamma 1=0.201$ Pa·s. The liquid crystal layer has homogenous alignment in the initial voltage-off state. The azimuth angle $\theta h$ for the liquid crystal layer is 0°. The pre-tilt angle for the liquid crystal layer is within 3°. Table 1 shows additional parameters for the LCD sub-pixel in the embodiment, with an area ratio 30:70 between the transmissive part and the reflective part.

TABLE 2

| Components | | Example value |
|---|---|---|
| Top polarization layer | absorption axis (°) | 0 |
| Top half-wave film | slow axis direction (°) | 135 |
| | phase retardation (nm) | 275 |
| LC layer in transmissive part | alignment direction (°) | 45 |
| | cell gap (µm) | 5.0 |
| LC layer in reflective part | alignment direction (°) | 0 |
| | cell gap (µm) | 2.52 |
| Bottom polarization layer | absorption axis (°) | 90 |

In some embodiments, the half-wave retardation film 326 is made of either single-axis or biaxial retarders.

FIG. 4A plots the maximum normalized transmittance for a sub-pixel with the above example parameter values at the voltage-off state is 90.97%, 98.88% and 85.31% to the RGB primaries for white LED backlight, respectively. The dark state appears at 1.9 Vrms.

FIG. 4B shows the maximum normalized reflectance for a sub-pixel with the above example parameter values at the voltage-off state is 99.28% to D65 sunlight as the ambient light. The dark state appears at 1.8 Vrms.

Therefore, the NW transflective LCD as described herein can be driven at low driving voltage below 2.0 Vrms for less power consumption, and has high transmittance and reflectance in the respective transmissive and reflective modes.

In some embodiments, the transmissive and reflective parts have a similar voltage-dependent transmittance/reflectance steepness and close voltage points to get the dark state. As a result, the NW transflective sub-pixel has a good gamma-matching for the transmissive and reflective parts. In some embodiments, a better optical performance may be achieved by fine-tune driving voltages at the different ambient light or BLU conditions either through a single voltage range or two voltage ranges across the liquid crystal layers for the transmissive and reflective parts.

2.3. NW Sub-Pixel with a Single Cell Gap

FIG. 5A illustrates a schematic cross-sectional view of an example NW transflective LCD sub-pixel 500 in a voltage-off state. The LCD sub-pixel 500 may comprise two or more parts. As illustrated, the LCD sub-pixel 500 comprises a transmissive part 501 and a reflective part 502.

The LCD sub-pixel 500 comprises a layer 510 of homogeneously aligned liquid crystal material. The liquid crystal layer 510 may be filled into a cell space by a capillary effect or a one-drop filling process under the vacuum condition. In some embodiments, the liquid crystal layer 510 is of a positive dielectric anisotropy type with $\Delta \in >0$. In some embodiments, the liquid crystal layer 510 is of a negative dielectric anisotropy type with $\Delta \in <0$.

The transmissive part 501 may have a liquid crystal cell gap the same as that of the reflective part 502.

In the reflective part 502, the inner surface, which is the top surface in FIG. 5A, of the bottom substrate layer 514 may be covered with a metallic reflective layer 511 such as aluminum (Al) or silver (Ag) to work as a reflective electrode 511a. In some embodiments, this metallic reflective layer 511 may be a bumpy metal layer.

The bottom substrate layer 514 may be made of glass. On the inner surface, which faces the liquid crystal layer 500, of the bottom substrate 514 in the transmissive part 501, a transparent indium-tin oxide (ITO) layer 512 may be provided as a pixel electrode 512a.

One, two, or more color filters 523a may be deposited on or near a surface of a top substrate 524. The color filters may cover both the transmissive part 501 and the reflective part 502, or only cover the transmissive part 501. If two or more color filters are used to cover some portions of the sub-pixel, the color filters may impart different colors. In some embodiments, at least one of the color filters covers the transmissive part 501. There may be red, green and blue (RGB) color filters 523a deposited on or near the inner surface, which faces the liquid crystal layer 510, of the top substrate 524 in the transmissive part 501. In areas that are not covered by the color filters 523a, a second over-coating layer 523b may be configured. This second over-coating layer 523b may be a passivation layer comprising an organic material such as a-Si:C:O and a-Si:O:F, or an inorganic material such as silicon nitride (SiNx) and silicon oxide (SiO2), prepared by plasma enhanced chemical vapor deposition or other similar sputtering methods.

An ITO layer 522 may be located between the top substrate 524 and the liquid crystal layer 510 as a common electrode 522a. In some embodiments, this ITO layer 522 covers the whole area of the LCD sub-pixel.

A bottom linear polarizer 518 and a top linear polarizer 528 with substantially the same polarization axis may be attached on outer surfaces of the bottom substrate 514 and top substrate 524 respectively.

A switch element in the sub-pixel 500 may be used to control whether the reflective electrode 511a is connected or disconnected with the pixel electrode 512a in the transmissive part 501. For example, in some operating modes of a transflective LCD display comprising the LCD sub-pixel 500, the switch element under display mode control logic may cause the reflective electrode 511a to be connected to the pixel electrode 512a; the electrodes 511a and 512a thus may be driven by a same signal to cause the transmissive part 501 and the receiver part 502 to simultaneously express a same pixel or sub-pixel value in tandem. In some other operating modes, the switch element under display mode control logic may cause the reflective electrode 511a to be disconnected from the pixel electrode 512a; the electrodes 511a and 512a may thus be driven by separate signals to cause the transmissive part 501 and the receiver part 502 to independently express different pixel or sub-pixel values. For example, in a transmissive operating mode, the transmissive part 501 may be set according to a pixel or sub-pixel value based on image data, while the receiver part 502 may be set in a dark black state. In a reflective operating mode, on the other hand, the reflective part 502 may be set according to a pixel or sub-pixel value based on image data, while the transmissive part 501 may be set in a dark black state.

In some embodiments, reflective-part liquid crystal layer portion and transmissive-part liquid crystal layer portion may be driven with the same voltage range values. However, even so, different voltage values may be concurrently and separately applied to a reflective-part liquid crystal layer portion in the reflective part 502 and to a transmissive-part liquid crystal layer portion in the transmissive part 501. In some other embodiments, reflective-part liquid crystal layer portion and transmissive-part liquid crystal layer portion may be driven with by two separate ranges of voltage values. Thus, in these other embodiments, a first voltage range values may be used to drive the reflective-part liquid crystal layer portion in the reflective part 502, while a second different voltage range values may be used to drive the transmissive-part liquid crystal layer portion in the transmissive part 501.

The switch element may be implemented by one or more thin-film transistors (TFTs) hidden beneath the metallic reflective layer 511 in the reflective part 502 to improve the aperture ratio of the transflective LCD.

In some embodiments, in the voltage-off state, the homogeneously aligned liquid crystal material layer 510 may be aligned in a direction such that the liquid crystal layer 510 in both the transmissive part 501 and the reflective part 502 is substantially a one-wave plate. In some embodiments, longer than a one-wave plate may be used in the liquid crystal layer 510. For example, a one-and-a-half-wave, two-wave, two-and-a-half, etc., plate may be used in the liquid crystal layer 510.

In different embodiments, liquid crystal materials with different birefringence properties may be used in the liquid crystal layer 510.

In some embodiments, rubbed polyimide layers, not shown in FIG. 5A, may be formed between one of ITO layers 512, 522, and the metallic reflective layer 511 and the liquid crystal layer 510 to induce the liquid crystal layer 510 near a rubbed polyimide layer to be homogeneously aligned along a rubbing direction in parallel with the planar surfaces of the substrate layers 514 and 524.

In some embodiments, a first half-wave retardation film 516 is arranged in between the first polarizer 518 and the bottom substrate 514, while a second half-wave retardation film 526 is arranged in between the second polarizer 528 and the top substrate 524. Slow axis directions of the first and second half-wave retardation films 516 and 526 may be substantially along a same direction in the transmissive part 501. Since the liquid crystal layer 510 is a one-wave plate in the voltage-off state, backlight 532 from a backlight unit (BLU) with a first polarization state when entering the first half-wave retardation film 516 produces a light with the same first polarization state when exiting the second half-wave retardation film 526. The light with the first polarization state passes through the polarization layer 528. This produces a normally white liquid crystal mode for the transmissive part 501 of the LCD sub-pixel 500.

In the reflective part 502, the light path of ambient light 542 crosses the liquid crystal layer 510 twice. Since the liquid crystal layer 510 in the reflective part 502 is a one-wave plate in the voltage-off state, the total effect of the liquid crystal layer 510 relative to the light path of the ambient light 542 is three one-wave plates. The ambient light 542 reflects through the reflective part 502. Thus, a normally white liquid crystal mode for the reflective part 502 of the LCD sub-pixel 500 is also produced.

In some embodiments, azimuth angles of the first half-wave retardation film 516 and the second half-wave retardation film 526 are the same, for example, θh. In the voltage-off state, the one-wave plate formed by the liquid crystal layer 510 in the transmissive part 501 can be considered as a pair of half-wave plates; azimuth angles of the half-wave plates in the pair are also the same, for example, θq. The first half-wave retardation film 516 and one of the half-wave plate form a one-wave plate, while the second half-wave retardation film 526 and the other of the half-wave plates form another one-wave plate. Thus, the optical configuration of the transmissive part 501 comprises two one-wave plates as described.

In the reflective part 502, only the second half-wave retardation film 526 and the liquid crystal layer 510 are in the optical path of the ambient light 542. As noted, in the voltage-off state, the liquid crystal layer 510 in the receiver part 502 is a one-wave plate. The azimuth angles of the second half-wave retardation film 526 and the liquid crystal layer 510 are θh and θq, respectively. Since the optical path of the ambient light 542 crosses the second half-wave retardation film 526 and the liquid crystal layer 510 twice, the optical configuration of the reflective part 502 effectively comprises three one-wave with the same azimuth angles θh and θq. Depending on a choice of an optimized central wavelength in the visible range from 380 nm to 780 nm, a retardation value of the one-wave plates may be configured with a value from 300 nm to 900 nm.

In some embodiments, the azimuth angles θh and θq may be configured to satisfy one of the two relationships as follows:

$$60 \leq 4\theta h - 2\theta q \leq 120, \quad \text{(Rel. 3a)}$$

or $$-120 \leq 4\theta h - 2\theta q \leq -60 \quad \text{(Rel. 3b)}$$

In some embodiments, to realize achromatic one-wave plates in both the transmissive and reflective part, the azimuth angles θh and θq may be configured to substantially satisfy the following relationship:

$$4\theta h - 2\theta q = \pm 90. \quad \text{(Rel. 4)}$$

To reduce the color dispersion of the liquid crystal layer 510 in the voltage-off state, θq may be configured to be 0° or 90° aligning with the rubbing direction, which is the liquid crystal orientation direction, with an angular variation of ±5°. In some embodiments, θh is set at around ±67.5° based on the relationship Rel.2. Since the polarizer pair is aligned parallel instead of perpendicular to each other, since the optical configurations of the transmissive part 501 and the reflective part 502 substantially coincide, the LCD sub-pixel 500 exhibits a better gamma curve matching ability between the transmissive and reflective modes than otherwise.

FIG. 5B illustrates a schematic cross-sectional view of the example NW transflective LCD sub-pixel 500 in a voltage-on state.

As illustrated in FIG. 5B, in the transmissive part 501, in the voltage-on state, the homogenously aligned LC material 510 will be tilted up by an ECB effect due to dielectric anisotropy of the liquid crystal material in layer 510. The tilting of the liquid crystal material in layer 510 induces an optical anisotropic change. This change may cause the liquid crystal layer 510 in the transmissive part 501 no longer to be a one-wave plate. Consequently, in the voltage-on state, a portion of the backlight 532 may pass through the polarization layers 518 and 528 to show one of a plurality of brightness levels (or display states) in the transmissive part 501, depending on which of a plurality of voltages, in a first voltage range, applied across the transmissive-part liquid crystal layer portion. The plurality of brightness levels for the transmissive part 501 may include a dark black state in the transmissive part 501 effectuated at one of the plurality of voltages, in the first voltage range, across the transmissive-part liquid crystal layer portion. In some embodiments, the first voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the first voltage range may be a voltage between 1.0 and 2.5 volts. Thus, the transmissive part of a sub-pixel as described herein may be operated with a low voltage maximum for an operational range, for example, the first voltage range.

Similarly, in the reflective part 502, in the voltage-on state, the LC material 510 will be tilted up by an ECB effect due to dielectric anisotropy of the liquid crystal material in layer 510. The tilting of the liquid crystal material in layer 510 induces an optical anisotropic change. This change may cause the liquid crystal layer 510 in the reflective part 502 no longer to be a one-wave plate. Consequently, in the voltage-on state, the ambient light 542 can now be reflected off from the metallic reflective layer 511 to various extents to show one of a plurality of brightness levels (or display states) in the reflective part 502, depending on which of a plurality of voltages, in a second voltage range, applied across the reflective-part liquid crystal layer portion. The plurality of brightness levels for the reflective part 502 may include a dark black state in the reflective part 502 effectuated at one of the plurality of voltages, in the second voltage range, across the reflective-part liquid crystal layer portion. In some embodiments, the second voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the second voltage range may be a voltage between 1.0 and 2.5 volts. Thus, the reflective part as described herein may be operated with a low voltage at maximum.

The voltage-on state of the transmissive part 501 and the voltage-on state of the reflective part 502 may be independently set. For example, when the reflective electrode 511a is connected to the transmissive electrode 512a, both the transmissive part 501 and the reflective part 502 may be set to a correlated brightness state. When the reflective electrode 511a is disconnected to the transmissive electrode 512a, the transmissive part 501 may be set to a first brightness state while the reflective part 502 may be set to a second different brightness state.

The operational voltage across the transmissive-part liquid crystal layer portion and the operational voltage across the reflective-part liquid crystal layer portion may be independently set. In some embodiments, the first voltage range for the transmissive-part liquid crystal layer portion may be different from the second voltage range for the reflective-part liquid crystal layer portion. For example, when the reflective-part liquid crystal layer portion is driven by a voltage of 3.5 volts in the second voltage range from 2 to 4 volts, the transmissive-part liquid crystal layer portion may be driven by a voltage of 1.5 volts in the first voltage range from 0 to 2 volts.

In some embodiments, color images can be displayed in combination with the R.G.B. color filters 523a in the transmissive part 501 in the transmissive or transflective operating modes, while black and white monochromic images can be shown in the reflective part 502 since there are no color filters on this region in the reflective operating modes.

In some embodiments, parameters for the liquid crystal layer may be, but are not limited to: birefringence $\Delta n$ ranging from 0.05 to 0.30 at the wavelength of 589.3 nm, dielectric anisotropy $\Delta \epsilon$ ranging from +4.0 to +20.0 at the frequency of 1000 Hz, and rotational viscosity γ1 ranging from 0.50 to 2.50 Pa·s at a typical temperature of 20° C. An area ratio may, but is not limited to, range from 10:90 to 40:60 between the transmissive part and the reflective part.

Since the transmissive-part liquid crystal layer portion in the NW transflective sub-pixel is configured to generate a phase retardation of at least one wave in the voltage-off state, a dark state appears at a relatively low driving voltage in the voltage-on state. In some embodiments, the maximum voltage in a voltage range to drive the transmissive-part liquid crystal layer portion may be configured as the relatively low driving voltage that produces the dark state for the transmissive part 501. Since the reflective-part liquid crystal layer portion in the NW transflective sub-pixel is configured to generate a phase retardation of at least two waves in the voltage-off state, two dark states appear at a relatively low driving voltage in the voltage-on state. In some embodiments, the maximum voltage in a voltage range to drive the reflective-part liquid crystal layer portion may be configured as one of the two relatively low driving voltages that produce the dark state for the reflective part 502.

In an exemplary embodiment, parameters for the liquid crystal layer are: birefringence Δn=0.1093, dielectric anisotropy Δ∈=9.1 and rotational viscosity γ1=0.201 Pa·s. The liquid crystal layer has homogenous alignment in the initial voltage-off state. The azimuth angle θh for the liquid crystal layer is 0°. The pre-tilt angle for the liquid crystal layer is within 3°. Table 1 shows additional parameters for the LCD sub-pixel in the embodiment, with an area ratio 30:70 between the transmissive part and the reflective part.

TABLE 3

| Components | | Example value |
|---|---|---|
| Top polarization layer | absorption axis (°) | 0 |
| Top half-wave film | slow axis direction (°) | 67.5 |
| | phase retardation (nm) | 275 |
| LC layer in transmissive part | alignment direction (°) | 0 |
| | cell gap (μm) | 5.0 |
| LC layer in reflective part | alignment direction (°) | 0 |
| | cell gap (μm) | 5.0 |
| Bottom half-wave film | slow axis direction (°) | 67.5 |
| | phase retardation (nm) | 275 |
| Bottom polarization layer | absorption axis (°) | 0 |

In some embodiments, the top and bottom half-wave retardation films 516 and 526 are made of either single-axis or biaxial retarders.

FIG. 6A plots the maximum normalized transmittance for a sub-pixel with the above example parameter values at the voltage-off state is 94.65%, 99.37% and 90.58% to the RGB primaries for white LED backlight, respectively. The dark state appears at 1.9 Vrms.

Figure 6B:
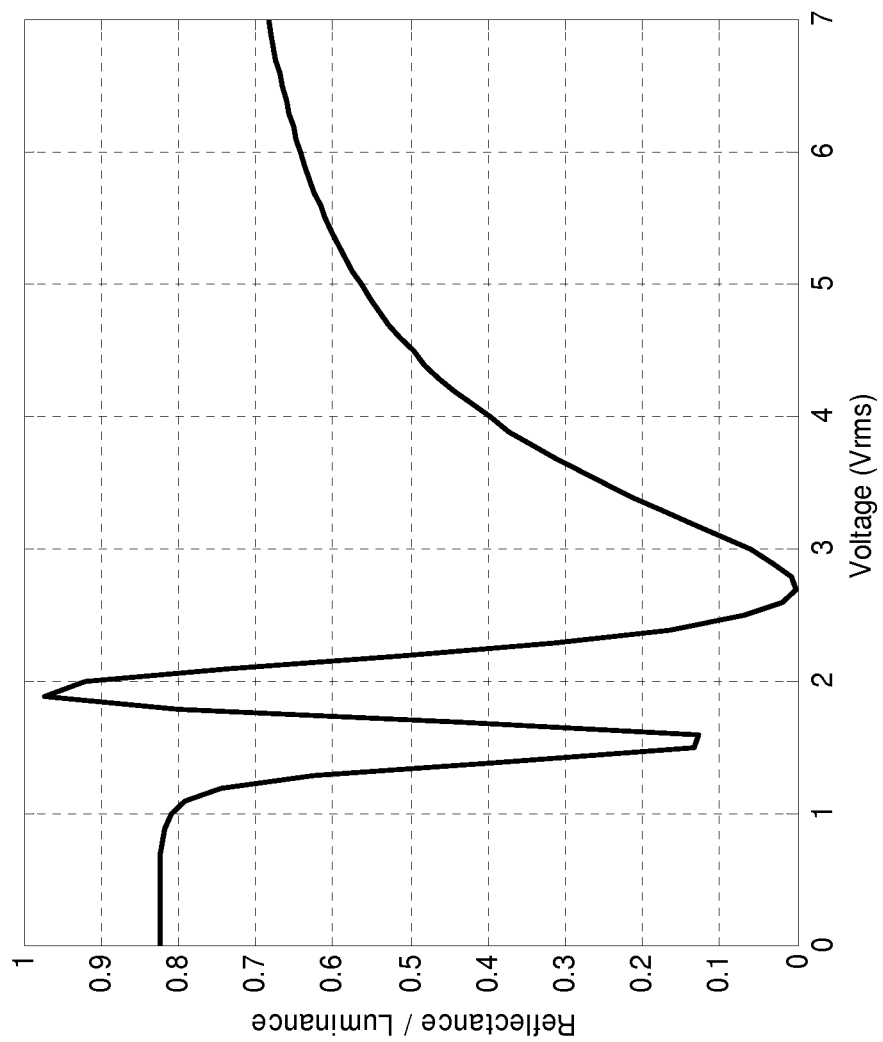

FIG. 6B shows the maximum normalized reflectance for a sub-pixel with the above example parameter values at the voltage-off state is 82.42% to D65 sunlight as the ambient light. Two dark states typically appear at the voltages of 1.6 Vrms and 2.7 Vrms respectively, and the better dark state exists at the relatively higher voltage point, 2.7 Vrms.

In some embodiments, liquid crystal layer portions in the transmissive part 501 and the reflective part 502 may be driven by different ranges of voltages. For example, the reflective-part liquid crystal layer portion may be driven to a white state at 1.9 Vrms to achieve a high brightness as high as 97.2%, and then be applied with a voltage of 2.7 Vrms to achieve an ideal dark state.

Therefore, the NW transflective LCD as described herein can be driven at low driving voltage below 2.0 Vrms for less power consumption, and has high transmittance and reflectance in the respective transmissive and reflective modes.

In some embodiments, the transmissive and reflective parts have a similar voltage-dependent transmittance/reflectance steepness and close voltage points to get the dark state. As a result, the NW transflective sub-pixel has a good gamma-matching for the transmissive and reflective parts. In some embodiments, a better optical performance may be achieved by fine-tune driving voltages at the different ambient light or BLU conditions either through a single voltage range or two voltage ranges across the liquid crystal layers for the transmissive and reflective parts.

2.4. MM Sub-Pixel

FIG. 7A illustrates a schematic cross-sectional view of an example mixed mode (MM) transflective LCD sub-pixel 700 in a voltage-off state. The LCD sub-pixel 700 may comprise two or more parts. As illustrated, the LCD sub-pixel 700 comprises a transmissive part 701 and a reflective part 702.

The LCD sub-pixel 700 comprises a layer 710 of homogeneously aligned liquid crystal material. The liquid crystal layer 710 may be filled into a cell space by a capillary effect or a one-drop filling process under the vacuum condition. In some embodiments, the liquid crystal layer 710 is of a positive dielectric anisotropy type with Δ∈>0. In some embodiments, the liquid crystal layer 710 is of a negative dielectric anisotropy type with Δ∈<0.

The transmissive part 701 may have a liquid crystal cell gap the same as that of the reflective part 702.

In the reflective part 702, the inner surface, which is the top surface in FIG. 7A, of the bottom substrate layer 714 may be covered with a metallic reflective layer 711 such as aluminum (Al) or silver (Ag) to work as a reflective electrode 711a. In some embodiments, this metallic reflective layer 711 may be a bumpy metal layer.

The bottom substrate layer 714 may be made of glass. On the inner surface, which faces the liquid crystal layer 700, of the bottom substrate 714 in the transmissive part 701, a transparent indium-tin oxide (ITO) layer 712 may be provided as a pixel electrode 712a.

One, two, or more color filters 723a may be deposited on or near a surface of a top substrate 724. The color filters may cover both the transmissive part 701 and the reflective part 702, or only cover the transmissive part 701. If two or more color filters are used to cover some portions of the sub-pixel, the color filters may impart different colors. In some embodiments, at least one of the color filters covers the transmissive part 701. There may be red, green and blue (RGB) color filters 723a deposited on or near the inner surface, which faces the liquid crystal layer 710, of the top substrate 724 in the transmissive part 701. In areas that are not covered by the color filters 723a, a second over-coating layer 723b may be configured. This second over-coating layer 723b may be a passivation layer comprising an organic material such as a-Si:C:O and a-Si:O:F, or an inorganic material such as silicon nitride (SiNx) and silicon oxide (SiO2), prepared by plasma enhanced chemical vapor deposition or other similar sputtering methods.

An ITO layer 722 may be located between the top substrate 724 and the liquid crystal layer 710 as a common electrode 722a. In some embodiments, this ITO layer 722 covers the whole area of the LCD sub-pixel.

A bottom linear polarizer 718 and a top linear polarizer 728 with substantially the same polarization axis may be attached on outer surfaces of the bottom substrate 714 and top substrate 724 respectively.

A switch element in the sub-pixel 700 may be used to control whether the reflective electrode 711a is connected or disconnected with the pixel electrode 712a in the transmissive part 701. For example, in some operating modes of a transflective LCD display comprising the LCD sub-pixel 700, the switch element under display mode control logic may cause the reflective electrode 711a to be connected to the pixel electrode 712a; the electrodes 711a and 712a thus may be driven by a same signal to cause the transmissive part 701 and the receiver part 702 to simultaneously express a same pixel or sub-pixel value in tandem. In some other operating modes, the switch element under display mode control logic may cause the reflective electrode 711a to be disconnected from the pixel electrode 712a; the electrodes 711a and 712a may thus be driven by separate signals to cause the transmissive part 701 and the receiver part 702 to independently express different pixel or sub-pixel values. For example, in a transmissive operating mode, the transmissive part 701 may be set according to a pixel or sub-pixel value based on image data, while the receiver part 702 may be set in a dark black state. In a reflective operating mode, on the other hand, the reflective part 702 may be set according to a pixel or sub-pixel value based on image data, while the transmissive part 701 may be set in a dark black state.

In some embodiments, different voltage values may be concurrently and separately applied to a reflective-part liquid crystal layer portion in the reflective part 702 and to a transmissive-part liquid crystal layer portion in the transmissive part 701. In some embodiments, reflective-part liquid crystal layer portion and transmissive-part liquid crystal layer portion may be driven with by two separate ranges of voltage values. A first voltage range values may be used to drive the reflective-part liquid crystal layer portion in the reflective part 702, while a second different voltage range values may be used to drive the transmissive-part liquid crystal layer portion in the transmissive part 701.

The switch element may be implemented by one or more thin-film transistors (TFTs) hidden beneath the metallic reflective layer 711 in the reflective part 702 to improve the aperture ratio of the transflective LCD.

In some embodiments, in the voltage-off state, the homogeneously aligned liquid crystal material layer 710 may be aligned in a direction such that the liquid crystal layer 710 in both the transmissive part 701 and the reflective part 702 is substantially a half-wave plate. In some embodiments, longer than a half-wave plate may be used in the liquid crystal layer 710. For example, a one-wave, one-and-a-half-wave, two-wave, two-and-a-half, etc., plate may be used in the liquid crystal layer 710.

In different embodiments, liquid crystal materials with different birefringence properties may be used in the liquid crystal layer 710.

In some embodiments, rubbed polyimide layers, not shown in FIG. 7A, may be formed between one of ITO layers 712, 722, and the metallic reflective layer 711 and the liquid crystal layer 710 to induce the liquid crystal layer 710 near a rubbed polyimide layer to be homogeneously aligned along a rubbing direction in parallel with the planar surfaces of the substrate layers 714 and 724.

In some embodiments, a first half-wave retardation film 716 is arranged in between the first polarizer 718 and the bottom substrate 714, while a second half-wave retardation film 726 is arranged in between the second polarizer 728 and the top substrate 724. Slow axis directions of the first and second half-wave retardation films 716 and 726 may be substantially along a same direction in the transmissive part 701. Since the liquid crystal layer 710 is a half-wave plate in the voltage-off state, backlight 732 from a backlight unit (BLU) with a first polarization state when entering the first half-wave retardation film 716 produces a light with a second polarization state orthogonal to the first polarization state when exiting the second half-wave retardation film 726. The light with the second polarization state may not pass through the polarization layer 728. This produces a normally black liquid crystal mode for the transmissive part 701 of the LCD sub-pixel 700.

In the reflective part 702, the light path of ambient light 742 crosses the liquid crystal layer 710 twice. Since the liquid crystal layer 710 in the reflective part 702 is a half-wave plate in the voltage-off state, the total effect of the liquid crystal layer 710 relative to the light path of the ambient light 742 is two half-wave plates. The ambient light 742 reflects through the reflective part 702. Thus, a normally white liquid crystal mode for the reflective part 702 of the LCD sub-pixel 700 is produced.

Thus, in the voltage-off state, the sub-pixel operates in a mixed mode (MM), i.e., normally black for the transmissive part 701 but normally white for the reflective part 702.

In some embodiments, azimuth angles of the first half-wave retardation film 716 and the second half-wave retardation film 726 are the same, for example, θh. In the voltage-off state, the half-wave plate formed by the liquid crystal layer 710 in the transmissive part 701 can be considered as a pair of quarter-wave plates; azimuth angles of the quarter-wave plates in the pair are also the same, for example, θq. The first half-wave retardation film 716 and one of the quarter-wave plate form a broadband quarter-wave plate, while the second half-wave retardation film 726 and the other of the quarter-wave plates form another broadband quarter-wave plate. Thus, the optical configuration of the transmissive part 701 comprises two broadband quarter-wave plates as described.

In the reflective part 702, only the second half-wave retardation film 726 and the liquid crystal layer 710 are in the optical path of the ambient light 742. As noted, in the voltage-off state, the liquid crystal layer 710 in the reflective part 702 is a half-wave plate. The azimuth angles of the second half-wave retardation film 726 and the liquid crystal layer 710 are θh and θq, respectively. Since the optical path of the ambient light 742 crosses the second half-wave retardation film 726 and the liquid crystal layer 710 twice, the optical configuration of the reflective part 702 effectively comprises two half-wave with the same azimuth angles θh and θq. Depending on a choice of an optimized central wavelength in the visible range from 380 nm to 780 nm, a retardation value of the half-wave plates may be configured with a value from 150 nm to 450 nm.

In some embodiments, the azimuth angles θh and θq may be configured to satisfy one of the two relationships as follows:

$$60 \leq 4\theta h - 2\theta q \leq 120, \quad \text{(Rel. 3a)}$$

or $$-120 \leq 4\theta h - 2\theta q \leq -60 \quad \text{(Rel. 3b)}$$

In some embodiments, to realize achromatic wave plates in both the transmissive and reflective part, the azimuth angles θh and θq may be configured to substantially satisfy the following relationship:

$$4\theta h - 2\theta q = \pm 90. \quad \text{(Rel. 4)}$$

To reduce the color dispersion of the liquid crystal layer 710 in the voltage-off state, θq may be configured to be 0° or 90° aligning with the rubbing direction, which is the liquid crystal orientation direction, with an angular variation of ±5°. In some embodiments, θh is set at around ±67.5° based on the relationship Rel.2. Since the polarizer pair is aligned parallel instead of perpendicular to each other, since the optical configurations of the transmissive part 701 and the reflective part 702 substantially coincide, the LCD sub-pixel 700 exhibits a better gamma curve matching ability between the transmissive and reflective modes than otherwise.

FIG. 7B illustrates a schematic cross-sectional view of the example MM transflective LCD sub-pixel 700 in a voltage-on state.

As illustrated in FIG. 7B, in the transmissive part 701, different voltages may be applied to the liquid crystal layer portions in the transmissive part 701 and in the reflective part 702 in the voltage-on state. The homogenously aligned LC material 710 will be tilted up by an ECB effect due to dielectric anisotropy of the liquid crystal material in layer 710. The tilting of the liquid crystal material in layer 710 induces an optical anisotropic change. This change may cause the liquid crystal layer 710 in the transmissive part 701 no longer to be a half-wave plate. Consequently, in the voltage-on state, the backlight 732 may pass through the polarization layers 718 and 728 to show one of a plurality of brightness levels (or display states) in the transmissive part 701, depending on which of a plurality of voltages, in a first voltage range, applied across the transmissive-part liquid crystal layer portion. The plurality of brightness levels for the transmissive part 701 may include a white state in the transmissive part 701 effectuated at one of the plurality of voltages, in the first voltage range, across the transmissive-part liquid crystal layer portion. In some embodiments, the first voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the first voltage range may be a voltage between 1.0 and 2.5 volts. Thus, the transmissive part of a sub-pixel as described herein may be operated with a low voltage maximum for an operational range, for example, the first voltage range.

In the reflective part 702, in the voltage-on state, the LC material 710 will be tilted up by an ECB effect due to dielectric anisotropy of the liquid crystal material in layer 710. The tilting of the liquid crystal material in layer 710 induces an optical anisotropic change. This change may cause the liquid crystal layer 710 in the reflective part 702 no longer to be a half-wave plate. Consequently, in the voltage-on state, the ambient light 742 can now be reflected off from the metallic reflective layer 711 to various extents to show one of a plurality of brightness levels (or display states) in the reflective part 702, depending on which of a plurality of voltages, in a second voltage range, applied across the reflective-part liquid crystal layer portion. The plurality of brightness levels for the reflective part 702 may include a dark black state in the reflective part 702 effectuated at one of the plurality of voltages, in the second voltage range, across the reflective-part liquid crystal layer portion. In some embodiments, the second voltage range for all brightness levels in operation may be, but is not limited to, 0 to 1.0 volt, 0 to 2.0 volts, 0 to 2.5 volts, 2 to 4 volts, etc. In some embodiments, while the upper limit, for example, the maximum voltage, of the second voltage range may be a voltage between 1.0 and 2.5 volts. Thus, the reflective part as described herein may be operated with a low voltage at maximum.

The voltage-on state of the transmissive part 701 and the voltage-on state of the reflective part 702 may be independently set. For example, when the reflective electrode 711a is connected to the transmissive electrode 712a, both the transmissive part 701 and the reflective part 702 may be set to a correlated brightness state. When the reflective electrode 711a is disconnected to the transmissive electrode 712a, the transmissive part 701 may be set to a first brightness state while the reflective part 702 may be set to a second different brightness state.

The operational voltage across the transmissive-part liquid crystal layer portion and the operational voltage across the reflective-part liquid crystal layer portion may be independently set. In some embodiments, the first voltage range for the transmissive-part liquid crystal layer portion may be different from the second voltage range for the reflective-part liquid crystal layer portion. For example, when the reflective-part liquid crystal layer portion is driven by a voltage of 3.5 volts in the second voltage range from 2 to 4 volts, the transmissive-part liquid crystal layer portion may be driven by a voltage of 1.5 volts in the first voltage range from 0 to 2 volts.

In some embodiments, color images can be displayed in combination with the R.G.B. color filters 723a in the transmissive part 701 in the transmissive or transflective operating modes, while black and white monochromic images can be shown in the reflective part 702 since there are no color filters on this region in the reflective operating modes.

In some embodiments, parameters for the liquid crystal layer may be, but are not limited to: birefringence $\Delta n$ ranging from 0.05 to 0.30 at the wavelength of 589.3 nm, dielectric anisotropy $\Delta \in$ ranging from +4.0 to +20.0 at the frequency of 1000 Hz, and rotational viscosity $\gamma 1$ ranging from 0.50 to 2.50 Pa·s at a typical temperature of 20° C. An area ratio may, but is not limited to, range from 10:90 to 40:60 between the transmissive part and the reflective part.

Since the transmissive-part liquid crystal layer portion in the MM transflective sub-pixel is configured to generate a phase retardation of at least half wave in the voltage-off state, a white state appears at a relatively low driving voltage in the voltage-on state. In some embodiments, the maximum voltage in a voltage range to drive the transmissive-part liquid crystal layer portion may be configured as the relatively low driving voltage that produces the white state for the transmissive part 701. Since the reflective-part liquid crystal layer portion in the MM transflective sub-pixel is configured to generate a phase retardation of at least one half-wave in the voltage-off state, a dark state appears at a relatively low driving voltage in the voltage-on state. In some embodiments, the maximum voltage in a voltage range to drive the reflective-part liquid crystal layer portion may be configured as the relatively low driving voltage that produces the dark state for the reflective part 702.

In an exemplary embodiment, parameters for the liquid crystal layer are: birefringence $\Delta n=0.1093$, dielectric anisotropy $\Delta \in=9.1$ and rotational viscosity $\gamma 1=0.201$ Pa·s. The liquid crystal layer has homogenous alignment in the initial voltage-off state. The azimuth angle $\theta h$ for the liquid crystal layer is 0°. The pre-tilt angle for the liquid crystal layer is within 3°. Table 1 shows additional parameters for the LCD sub-pixel in the embodiment, with an area ratio 30:70 between the transmissive part and the reflective part.

TABLE 4

| Components | | Example value |
|---|---|---|
| Top polarization layer | absorption axis (°) | 0 |
| Top half-wave film | slow axis direction (°) | 67.5 |
| | phase retardation (nm) | 275 |
| LC layer in transmissive part | alignment direction (°) | 0 |
| | cell gap (μm) | 2.5 |
| LC layer in reflective part | alignment direction (°) | 0 |
| | cell gap (μm) | 2.5 |
| Bottom half-wave film | slow axis direction (°) | 67.5 |
| | phase retardation (nm) | 275 |
| Bottom polarization layer | absorption axis (°) | 0 |

In some embodiments, the top and bottom half-wave retardation films 716 and 726 are made of either single-axis or biaxial retarders.

FIG. 8A plots the maximum normalized transmittance for a sub-pixel with the above example parameter values at the voltage-on state is 91.05%, 98.50% and 99.08% to the RGB primaries for white LED backlight, respectively. In this NB transmissive mode, the maximum bright state appears at around 6.0 Vrms.

Figure 8B:
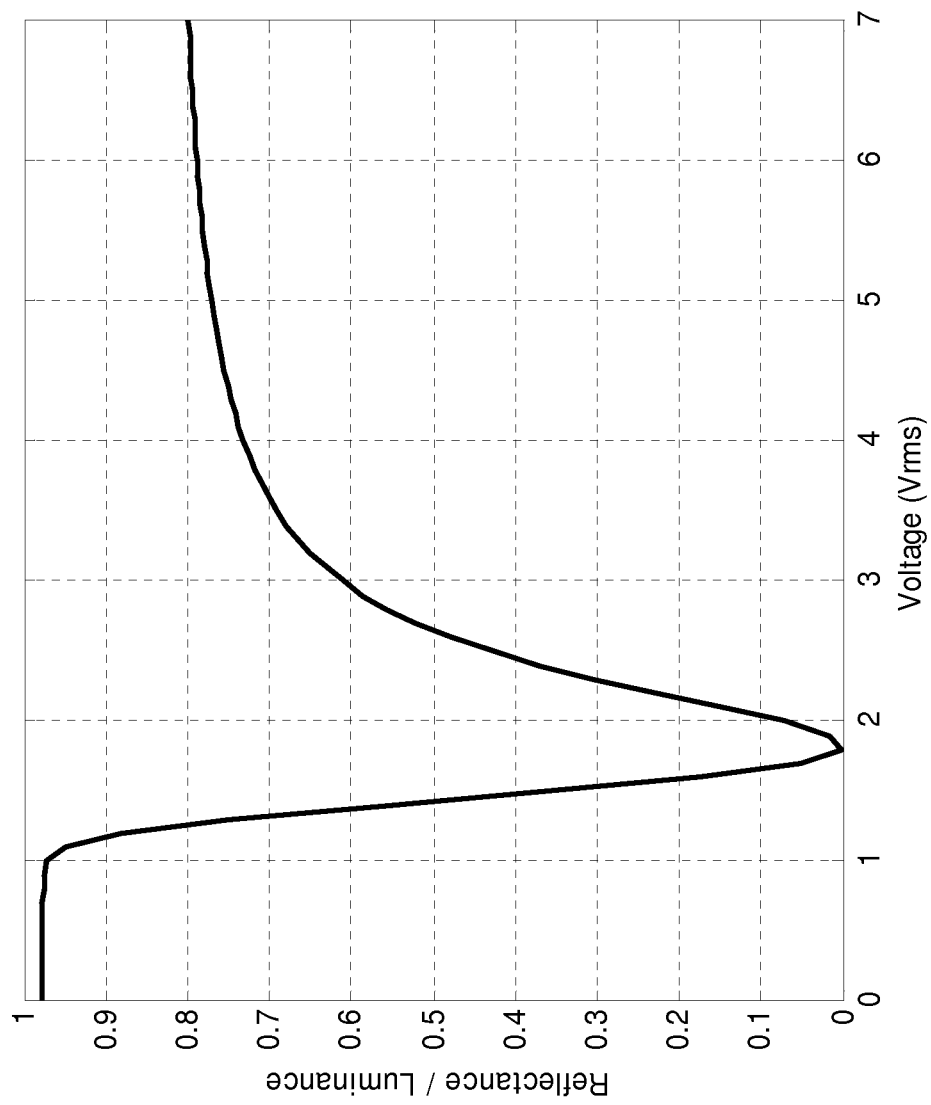

FIG. 8B shows the maximum normalized reflectance for the sub-pixel with the above example parameter values at the voltage-off state is 97.67% to D65 sunlight as the ambient light. In this NW reflective mode, the dark state appears at 1.8 Vrms, which indicates that the reflective part 702 may be driven at low driving voltage below 2 Vrms for less power consumption.

In some embodiments, liquid crystal layer portions in the transmissive part 701 and the reflective part 702 may be driven by different ranges of voltages.

In some embodiments, two TFTs may be independently connected with the transmissive part 701 and the reflective part 702, and driven separately in the voltage-on state. High transmittance and reflectance of the sub-pixel may be realized with the applications of different voltages over the transmissive-part liquid crystal layer portion and the reflective-part liquid crystal layer portion with less power consumption. Under no or little ambient light, the transmissive part 701 may be applied with any voltage in a first voltage range in the voltage-on state, while the reflective part 702 maintains the voltage-off state, thereby resulting in a pure transmissive mode. Under strong ambient light, the transmissive part 701 maintains the voltage-off state, while the reflective part 702 may be applied with any voltage in a second voltage range, resulting in a pure reflective mode. Under intermediate ambient light such as in the office or home, both the transmissive part 701 and the reflective part 702 may be applied with separate voltages in the voltage-on state in a combined transflective mode.

Therefore, it can be seen that the proposed MM transflective LCD can be driven at low driving voltage below 2.0 Vrms for less power consumption in the pure reflective mode, has high transmittance and reflectance to the respective transmissive and reflective modes, and shows high optical performance in the combined transflective mode to further reduce the power consumption.

In some embodiments, the transmissive and reflective parts have a similar voltage-dependent transmittance/reflectance steepness and close voltage points to get the dark state. As a result, the MM transflective sub-pixel has a good gamma-matching for the transmissive and reflective parts. In some embodiments, a better optical performance may be achieved by fine-tune driving voltages at the different ambient light or BLU conditions either through a single voltage range or two voltage ranges across the liquid crystal layers for the transmissive and reflective parts.

3. Extensions and Variations

To illustrate a clear example, transflective LCD sub-pixels described herein comprise a first metallic reflective layer and a second metallic reflective layer. The transflective LCD sub-pixels may further comprise a third reflective layer between the bottom substrate layer and the top substrate layer. This third reflective layer may be placed in the transmissive part or the reflective part of a transflective LCD or both. In some embodiments, the first metallic reflective layer may be of a pattern that comprises multiple reflective components.

To illustrate a clear example, transflective LCD sub-pixels described herein comprise a first metallic reflective layer and a second metallic reflective layer. The transflective LCD sub-pixels may further comprise a third reflective layer between the bottom substrate layer and the top substrate layer. This third reflective layer may be placed in the transmissive part or the reflective part of a transflective LCD or both. In some embodiments, the first metallic reflective layer may be of a pattern that comprises multiple reflective components.

To illustrate a clear example, a first electrode layer and a second electrode layer are placed adjacent to a bottom substrate layer and a top substrate layer, respectively. In other embodiments, both electrode layers may be placed adjacent to one of the bottom substrate layer and the top substrate layer.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A transflective liquid crystal display comprising a plurality of sub-pixels, each sub-pixel comprising:
   a reflective part, comprising:
      first portions of a first retardation film, a first polarizing layer, a bottom substrate layer, a top substrate layer, and a common electrode portion, wherein the top substrate layer is opposite to the bottom substrate layer;
      a reflective layer adjacent to the bottom substrate layer;
      a reflective-part liquid crystal layer portion of a liquid crystal layer between the bottom substrate layer and the top substrate layer;
   a transmissive part, comprising:
      second portions of the first retardation film, the first polarizing layer, the bottom substrate layer, the top substrate layer, and the common electrode portion;
      a transmissive-part liquid crystal layer portion of the liquid crystal layer between the bottom substrate layer and the top substrate layer;
   wherein a transmissive-part cell gap of the transmissive-part liquid crystal layer portion is configured as a plate of at least a half-wavelength or more in a voltage-off state of the transmissive-part liquid crystal layer portion;
   wherein said each sub-pixel is normally-white at a voltage-off state.

2. The transflective liquid crystal display according to claim 1, wherein the transmissive-part liquid crystal layer portion is configured to be driven to a transmissive display state by 1.0 volt at maximum to 2.7 volts at maximum.

3. The transflective liquid crystal display according to claim 1, wherein the reflective-part liquid crystal layer portion is configured to be driven to a reflective display state by 1.0 volt at maximum to 2.7 volts at maximum.

4. The transflective liquid crystal display according to claim 1, wherein the reflective-part liquid crystal layer portion comprises liquid crystal molecules that are homogeneously aligned along a second direction in the voltage-off state of the reflective-part liquid crystal layer portion.

5. The transflective liquid crystal display according to claim 1, wherein the transmissive part further comprises a portion of a second retardation film.

6. The transflective liquid crystal display according to claim 1, wherein the reflective part further comprises an over-coating layer adjacent to one of the bottom substrate layer and the top substrate layer, wherein the over-coating layer is between the bottom substrate layer and the top substrate layer, and wherein a reflective-part cell gap of the reflective-part liquid crystal layer portion is a plate of a half-wavelength or more in a voltage-off state of the reflective-part liquid crystal layer portion.

7. The transflective liquid crystal display according to claim 1, wherein a reflective-part cell gap of the reflective-part liquid crystal layer portion is equal to the transmissive-part cell gap.

8. The transflective liquid crystal display according to claim 1, wherein the reflective-part liquid crystal layer portion is configured to be driven to a reflective display state by a first voltage and wherein the transmissive-part liquid crystal layer portion is configured to be driven to a transmissive display state by the first voltage.

9. The transflective liquid crystal display according to claim 1, wherein the reflective-part liquid crystal layer portion is configured to be driven to a reflective display state by a first voltage and wherein the transmissive-part liquid crystal layer portion is configured to be driven to a transmissive display state by a second, different, voltage.

10. The transflective liquid crystal display according to claim 1, wherein the sub-pixel further comprises at least one color filter that covers at least a portion of the transmissive part sub-pixel.

11. The transflective liquid crystal display according to claim 10, wherein the sub-pixel is a part of a composite pixel, and wherein the composite pixel comprises another sub-pixel that is configured to express a different color than the sub-pixel.

12. The transflective liquid crystal display according to claim 1, wherein a normal direction of the bottom substrate layer is parallel to the first direction or to the second direction.

13. The transflective liquid crystal display according to claim 1, wherein the sub-pixel further comprises one or more orientation films and wherein one or more of the first direction and the second direction are along a rubbing direction of at least one of the one or more orientation films.

14. The transflective liquid crystal display according to claim 1, wherein optical birefringence of the liquid crystal layer is electrically controllable.

15. The transflective liquid crystal display according to claim 1, wherein the first retardation film has an azimuth angle of $\theta_h$, wherein the transmit-part liquid crystal layer portion has an azimuth angle of $\theta_q$, and wherein the azimuth angles satisfy one of: $60 \leq 4\theta_h - 2\theta_q \leq 120$, or $-120 \leq 4\theta_h - 2\theta_q \leq -60$.

16. The transflective liquid crystal display according to claim 1, wherein the reflective part comprises a reflective electrode, wherein the transmissive part comprises a transmissive electrode, and wherein the sub-pixel comprises a switching element that is configured to control whether the reflective electrode is electrically connected to the transmissive electrode.

17. The transflective liquid crystal display according to claim 1, wherein the reflective part comprises a reflective electrode, wherein the transmissive part comprises a transmissive electrode, wherein the common electrode is located on a first side of the liquid crystal layer, and wherein the transmissive electrode and the reflective electrode are located on a second opposing side of the liquid crystal layer.

18. The transflective liquid crystal display according to claim 1, wherein the sub-pixel further comprises a light recycling film between the bottom substrate layer and a backlight unit that redirects backlight from the reflective part to the transmissive part.

19. The transflective liquid crystal display according to claim 18, wherein the light recycling film is configured to turn incident light of any polarized state into redirected light with a particular polarization state.

20. The transflective liquid crystal display according to claim 1, wherein the transmissive part liquid crystal layer portion comprises homogeneously aligned liquid crystal molecules.

21. A computing device, comprising:
one or more processors;
a transflective liquid crystal display comprising a plurality of sub-pixels, each sub-pixel comprising:
a reflective part, comprising:
first portions of a first retardation film, a first polarizing layer, a bottom substrate layer, a top substrate layer, and a common electrode portion, wherein the top substrate layer is opposite to the bottom substrate layer;
a reflective layer adjacent to the bottom substrate layer;
a reflective-part liquid crystal layer portion of a liquid crystal layer between the bottom substrate layer and the top substrate layer;
a transmissive part, comprising:
second portions of the first retardation film, the first polarizing layer, the bottom substrate layer, the top substrate layer, and the common electrode portion;
a transmissive-part liquid crystal layer portion of the liquid crystal layer between the bottom substrate layer and the top substrate layer;
wherein a transmissive-part cell gap of the transmissive-part liquid crystal layer portion is configured as a plate of at least a half-wavelength or more in a voltage-off state of the transmissive-part liquid crystal layer portion;
wherein said each sub-pixel is normally-white at a voltage-off state.

22. The computer device according to claim 21, wherein the transmissive-part liquid crystal layer portion is configured to be driven to a transmissive display state by 1.0 volt at maximum to 2.7 volts at maximum.

23. The computer device according to claim 21, wherein the reflective-part liquid crystal layer portion is configured to be driven to a reflective display state by 1.0 volt at maximum to 2.7 volts at maximum.

24. The computer device according to claim 21, wherein the reflective-part liquid crystal layer portion comprises liquid crystal molecules that are homogeneously aligned along a second direction in the voltage-off state of the reflective-part liquid crystal layer portion.

25. The computer device according to claim 21, wherein the transmissive part further comprises a portion of a second retardation film.

26. The computer device according to claim 21, wherein the reflective part further comprises an over-coating layer adjacent to one of the bottom substrate layer and the top substrate layer, wherein the over-coating layer is between the bottom substrate layer and the top substrate layer, and wherein a reflective-part cell gap of the reflective-part liquid crystal layer portion is a plate of a half-wavelength or more in a voltage-off state of the reflective-part liquid crystal layer portion.

27. The computer device according to claim 21, wherein a reflective-part cell gap of the reflective-part liquid crystal layer portion is equal to the transmissive-part cell gap.

28. The computer device according to claim 21, wherein the sub-pixel further comprises a light recycling film between the bottom substrate layer and a backlight unit that redirects backlight from the reflective part to the transmissive part.

29. A method of fabricating a transflective liquid crystal display, comprising:
providing a plurality of pixels, a pixel comprising:
a reflective part, comprising:
first portions of a first retardation film, a first polarizing layer, a bottom substrate layer, a top substrate layer, and a common electrode portion, wherein the top substrate layer is opposite to the bottom substrate layer;
a reflective layer adjacent to the bottom substrate layer;
a reflective-part liquid crystal layer portion of a liquid crystal layer between the bottom substrate layer and the top substrate layer;
a transmissive part, comprising:

second portions of the first retardation film, the first polarizing layer, the bottom substrate layer, the top substrate layer, and the common electrode portion;
a transmissive-part liquid crystal layer portion of the liquid crystal layer between the bottom substrate layer and the top substrate layer;
wherein a transmissive-part cell gap of the transmissive-part liquid crystal layer portion is configured as a plate of at least a half-wavelength or more in a voltage-off state of the transmissive-part liquid crystal layer portion;
wherein said each sub-pixel is normally-white at a voltage-off state.

30. The method according to claim 29, wherein the transmissive-part liquid crystal layer portion is configured to be driven to a transmissive display state by 1.0 volt at maximum to 2.7 volts at maximum.

31. The method according to claim 29, wherein the reflective-part liquid crystal layer portion is configured to be driven to a reflective display state by 1.0 volt at maximum to 2.7 volts at maximum.

* * * * *